US009201734B2

(12) United States Patent
Matsumura et al.

(10) Patent No.: US 9,201,734 B2
(45) Date of Patent: Dec. 1, 2015

(54) STORAGE CONTROL SYSTEM, RECORDING MEDIUM STORING RECOVERY PROGRAM, AND METHOD

(71) Applicant: FUJITSU LIMITED, Kawasaki-shi, Kanagawa (JP)

(72) Inventors: Tadashi Matsumura, Kawasaki (JP); Noriyuki Yasu, Kawasaki (JP); Tomohiko Muroyama, Yokohama (JP); Motoki Sotani, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 14/022,271

(22) Filed: Sep. 10, 2013

(65) Prior Publication Data

US 2014/0082412 A1    Mar. 20, 2014

(30) Foreign Application Priority Data

Sep. 18, 2012   (JP) ................................. 2012-205012

(51) Int. Cl.
*G06F 11/00* (2006.01)
*G06F 11/14* (2006.01)
*G06F 11/16* (2006.01)
*G06F 11/20* (2006.01)

(52) U.S. Cl.
CPC ........ *G06F 11/1402* (2013.01); *G06F 11/1441* (2013.01); *G06F 11/1612* (2013.01); *G06F 11/2082* (2013.01); *G06F 11/2071* (2013.01)

(58) Field of Classification Search
CPC ............ G06F 11/1402; G06F 11/1612; G06F 11/2071; G06F 11/2082; G06F 11/1435; G06F 11/1441
See application file for complete search history.

(56) References Cited

U.S. PATENT DOCUMENTS

| | | | | |
|---|---|---|---|---|
| 6,480,970 | B1 * | 11/2002 | DeKoning et al. | 714/6.12 |
| 7,921,267 | B1 * | 4/2011 | Yadav et al. | 711/162 |
| 2006/0106898 | A1 * | 5/2006 | Frondozo et al. | 707/204 |
| 2007/0130146 | A1 * | 6/2007 | Heinz et al. | 707/9 |
| 2007/0168754 | A1 * | 7/2007 | Zohar et al. | 714/42 |
| 2014/0082412 | A1 * | 3/2014 | Matsumura et al. | 714/6.12 |

FOREIGN PATENT DOCUMENTS

JP    2005-149248    6/2005

* cited by examiner

*Primary Examiner* — Philip Guyton
(74) *Attorney, Agent, or Firm* — Fujitsu Patent Center

(57) ABSTRACT

A storage control system includes: storage units each including a first storage area storing information and a second storage area storing management information that contains attribute information of partition information indicating how information is stored in partitions obtained by partitioning the first storage area; an obtaining unit to obtain the management information from the plurality of storage units; a determination unit to determine whether abnormal management information is present in the obtained management information by comparing the obtained management information with itself; and a recovery unit to reconfigure, when it is determined there is the abnormal management information, for each unit of partition, information stored in the first storage area of the storage unit from which the abnormal management information has been obtained by using one of the storage units from which normal management information has been obtained, based on attribute information of the normal management information in each partition.

15 Claims, 26 Drawing Sheets

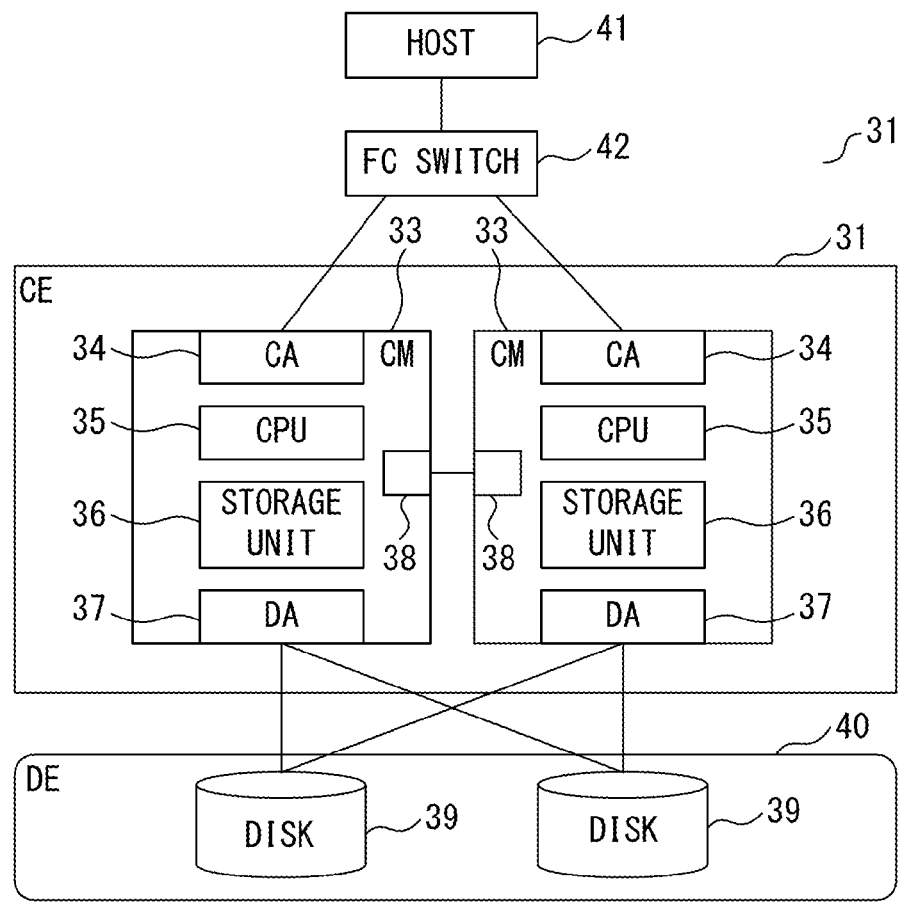
F I G. 3

BLOCK ATTRIBUTES MAPPING INFORMATION ~87

| Block (Raw) | Block (Column) | | | | | | | |
|---|---|---|---|---|---|---|---|---|
| | 1 | 2 | 3 | 4 | 5 | 6 | ... | N |
| 1 | M,V,0 | M,V,0 | M,V,0 | M,V,0 | M,V,0 | M,V,0 | | M,V,0 |
| 2 | M,V,0 | M,V,0 | M,V,0 | M,V,0 | M,V,0 | M,V,0 | | M,V,0 |
| 3 | D,V,0 | D,V,0 | D,V,0 | D,V,0 | D,V,0 | D,V,0 | | D,V,0 |
| 4 | D,V,0 | D,V,0 | D,V,0 | D,V,0 | D,V,0 | D,V,0 | | D,V,0 |
| 5 | D,V,R1 | D,V,R1 | D,V,R1 | D,V,R1 | D,V,R1 | D,V,R1 | | D,V,R1 |
| 6 | D,I,0 | D,I,0 | D,I,0 | D,I,0 | D,I,0 | D,I,0 | | D,I,0 |
| .. | | | | .. | | | | |
| K | F,I,0 | F,I,0 | F,I,0 | F,I,0 | F,I,0 | F,I,0 | | F,I,0 |

F I G. 7 B

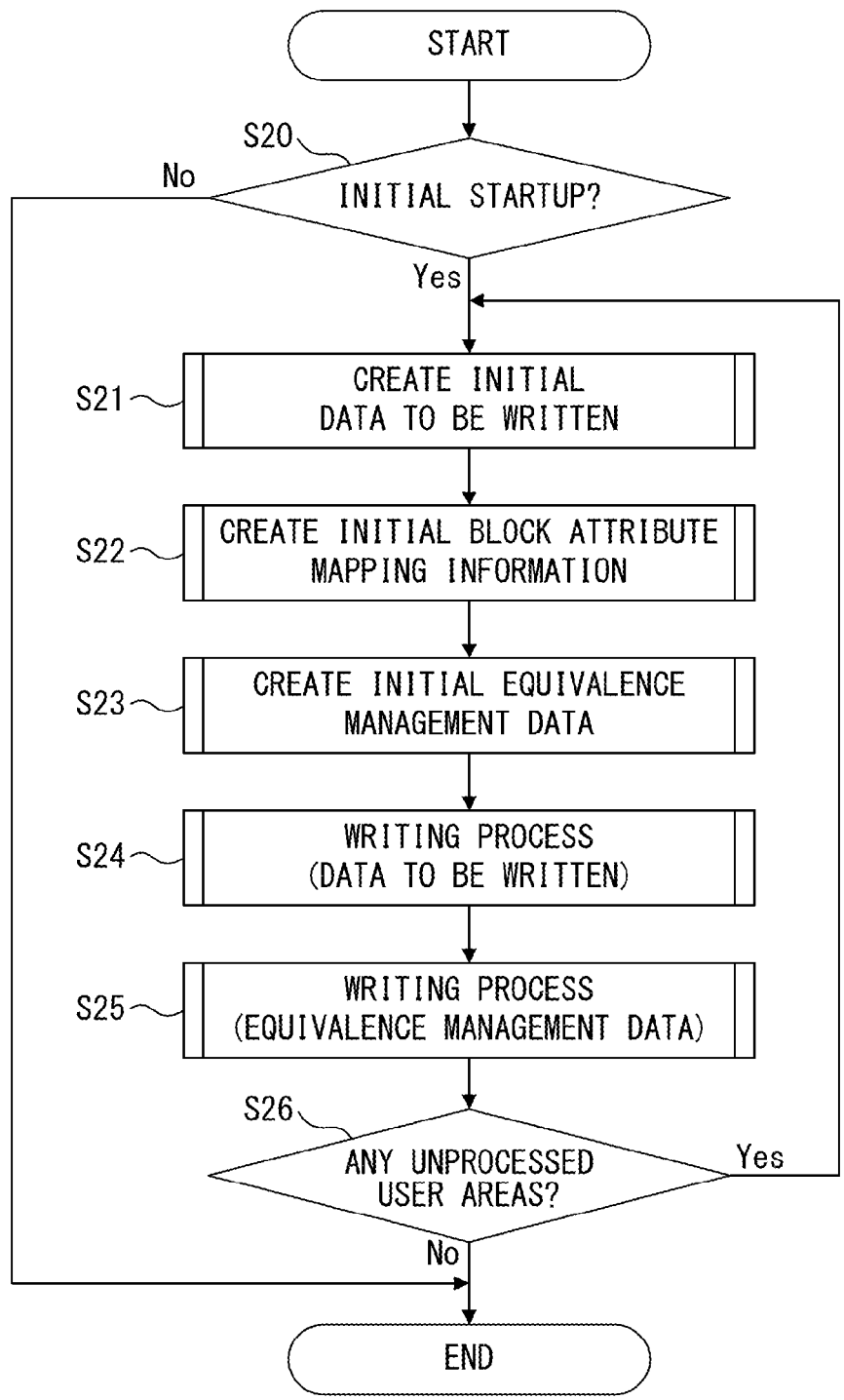
F I G. 9

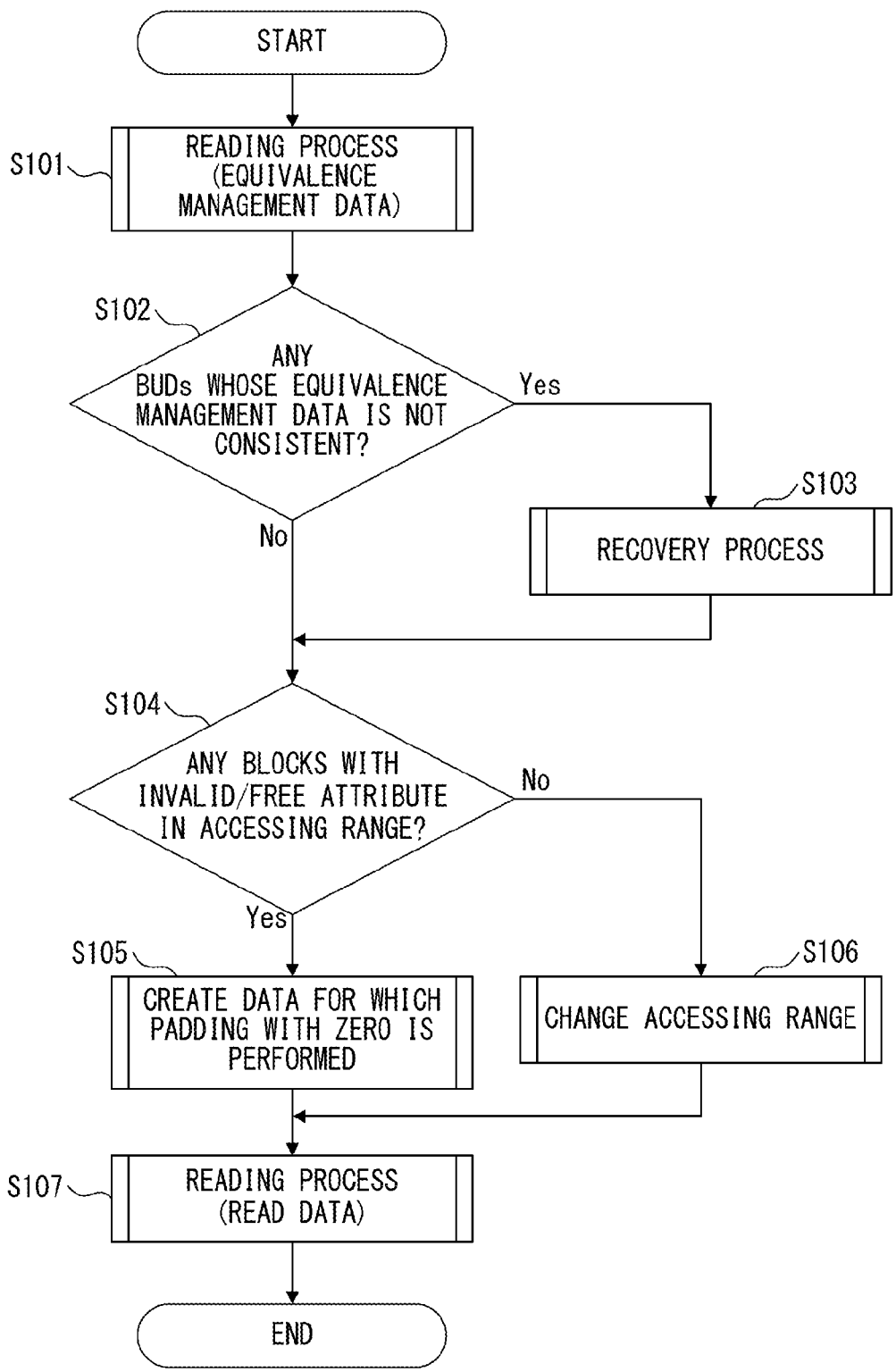
F I G. 13

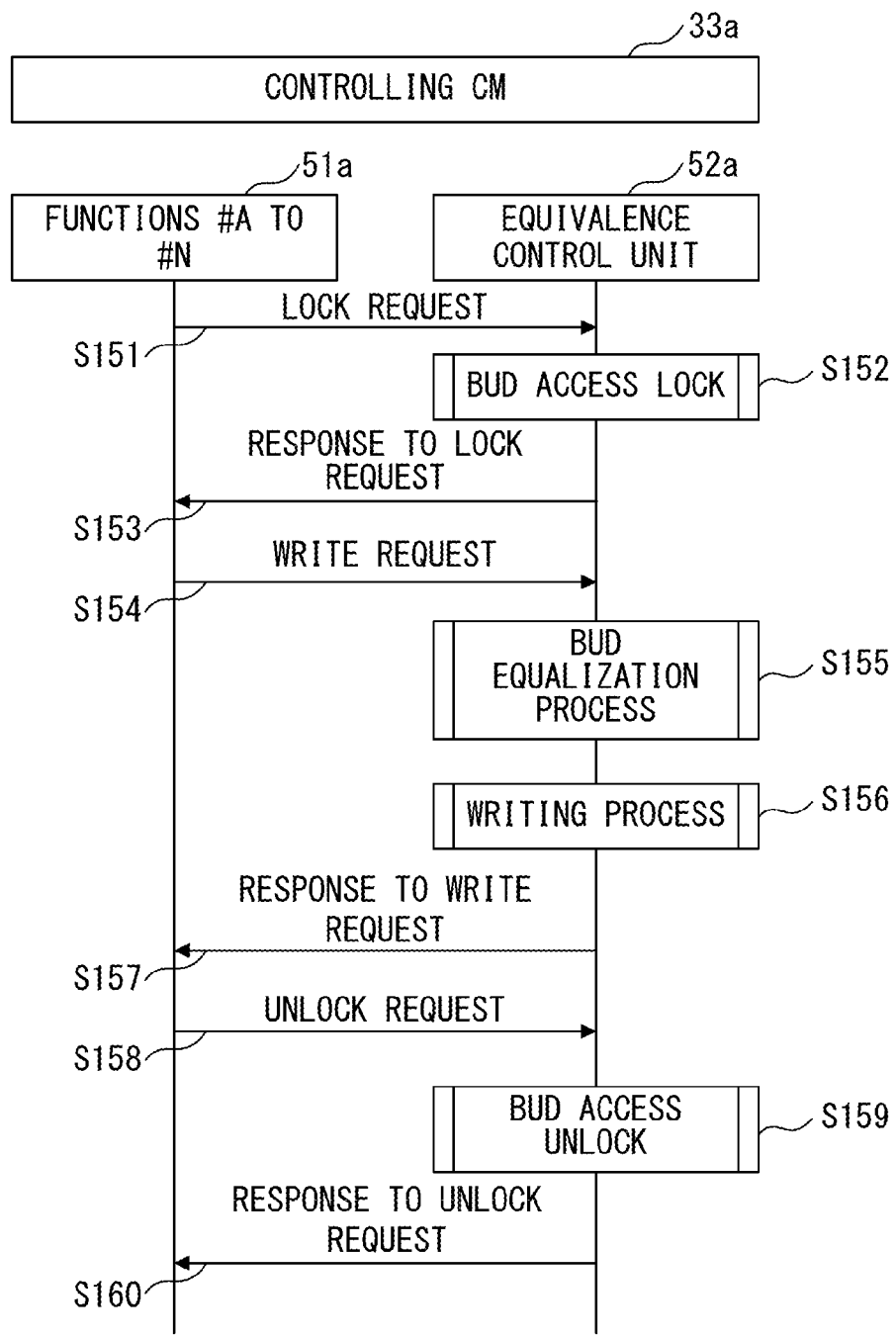
F I G. 1 7

STORAGE CONTROL SYSTEM, RECORDING MEDIUM STORING RECOVERY PROGRAM, AND METHOD

CROSS-REFERENCE TO RELATED APPLICATION

This application is based upon and claims the benefit of priority of the prior Japanese Patent Application No. 2012-205012, filed on Sep. 18, 2012, the entire contents of which are incorporated herein by reference.

FIELD

The embodiments discussed herein are related to a control technique of storage devices.

BACKGROUND

A storage device relates to a disk storage system in which two or more disk drives are installed. A storage device includes a controller module (hereinafter, referred to as "CM") that writes the data transmitted from a host into a disk drive.

A storage device also includes a BUD (Backup Utility Device) inside and outside the CM. As an example of the BUD, a HDD (Hard Disk Drive), an SSD (Solid State Drive), and a USB (Universal Serial Bus) memory device are used. The records inside the device such as a device log and firmware archive are stored in the BUD.

The data in the BUD is made redundant by two or more BUDs according to each purpose of use (requirement of system performance). The data consistency and redundancy maintenance among BUDs is realized by an equivalence control unit of the CM. As a result, the mutual equivalence of the data among BUDs may be maintained.

The following technique is known as a recovery technique of a storage device. In this known technique, when an OS (Operating System) starts operating, a service program loads a metadata record/judgment/repair unit into the control unit of a storage device. When a data lost error is detected by the control unit, the metadata record/judgment/repair unit performs the following processes. Specifically, the metadata record/judgment/repair unit judges whether the error occurrence address is in a metadata area or in a file data area based on the error occurrence address of a data lost error of the data storage unit and the metadata read from the metadata backup unit. When the error occurrence address is in the metadata area, the metadata record/judgment/repair unit restores the metadata area of the data storage unit with the metadata area backup data of the metadata backup unit.

Patent Document 1: Japanese Laid-open Patent Publication No. 2005-149248

SUMMARY

A storage control system according to one aspect of the present embodiment includes a plurality of storage units, an obtaining unit, a determination unit, and a recovery unit. The storage unit includes a first storage area and a second storage area. The first storage area stores information. The second storage area stores management information that contains attribute information of partition information indicating how information is stored in partitions obtained by partitioning the first storage area. The obtaining unit obtains management information from the plurality of storage units. The determination unit determines whether abnormal management information is present in the obtained management information by comparing the obtained management information with itself. When a presence of abnormal management information is detected, the recovery unit reconfigures, for each unit of partition, information stored in the first storage area of the storage unit from which the abnormal management information has been obtained by using one of the storage units from which the normal management information has been obtained, according to attribute information of normal management information in each partition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates the hardware configuration of a storage system according to the present embodiment.

FIGS. 7A and 7B illustrate block attribute mapping information according to the present embodiment.

FIG. 9 illustrates an operational flow of the equivalence control unit at an initial startup of the storage device according to the present embodiment.

FIG. 13 illustrates an operational flow of the equivalence control unit when a reading process from a BUD is performed by function control units, according to the present embodiment.

FIG. 17 is a general view of the writing process sequence according to the present embodiment.

DESCRIPTION OF EMBODIMENTS

The above recovery technique is a recovery technique for a single storage device, and is not a recovery technique for a recovery system in which the data consistency among a plurality of storage devices is taken into consideration. For this reason, when data consistency is not present among a plurality of storage devices in a redundant system, it takes an enormous amount of time to recover a system if the above recovery technique is used.

In one aspect of the present invention, a storage control technique is provided by which the data consistency among storage devices is maintained and efficient recovery is performed.

Figure 1A:
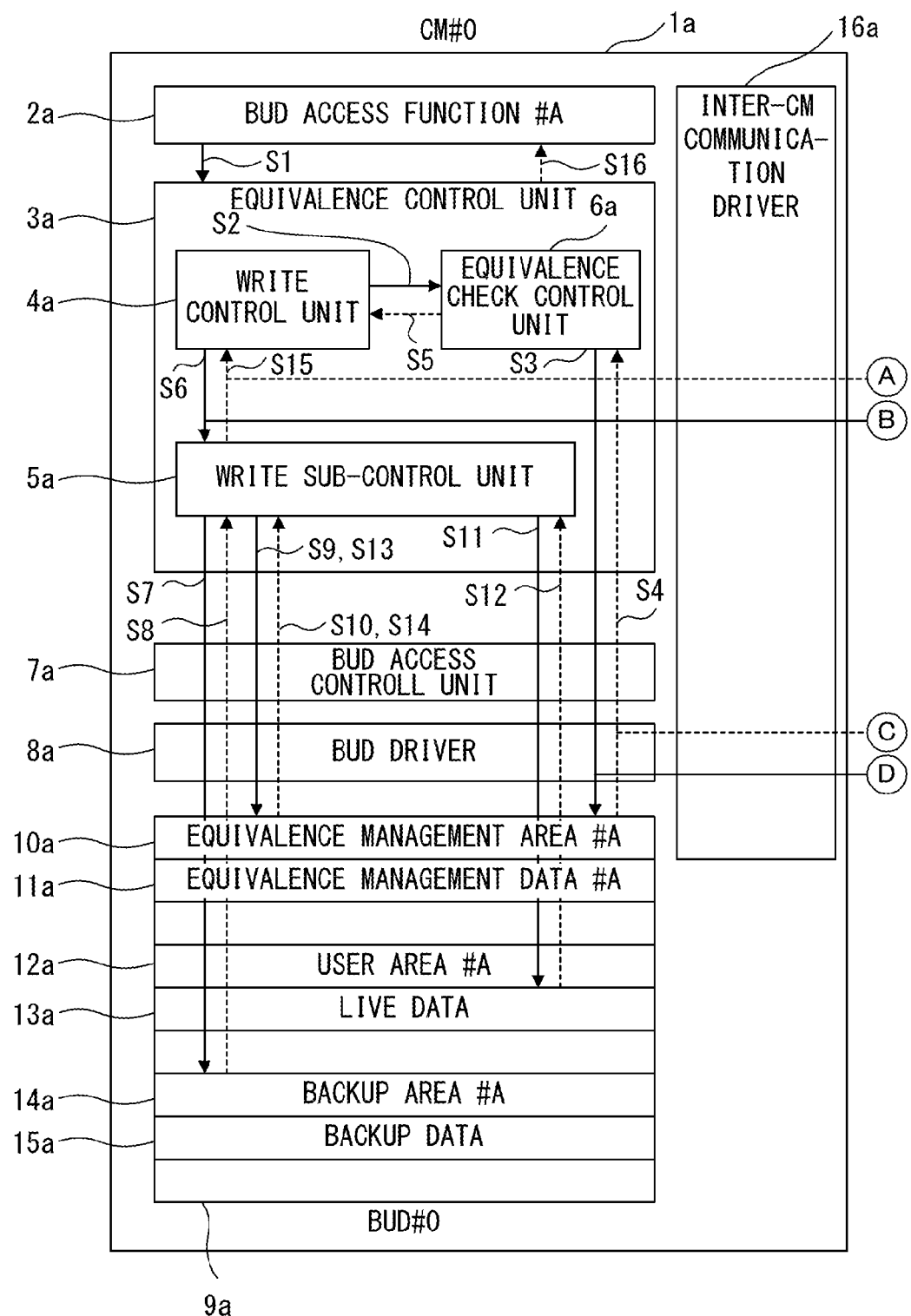
FIGS. 1A and 1B illustrate equivalence control for maintaining the data consistency among BUDs.
Figure 1B:
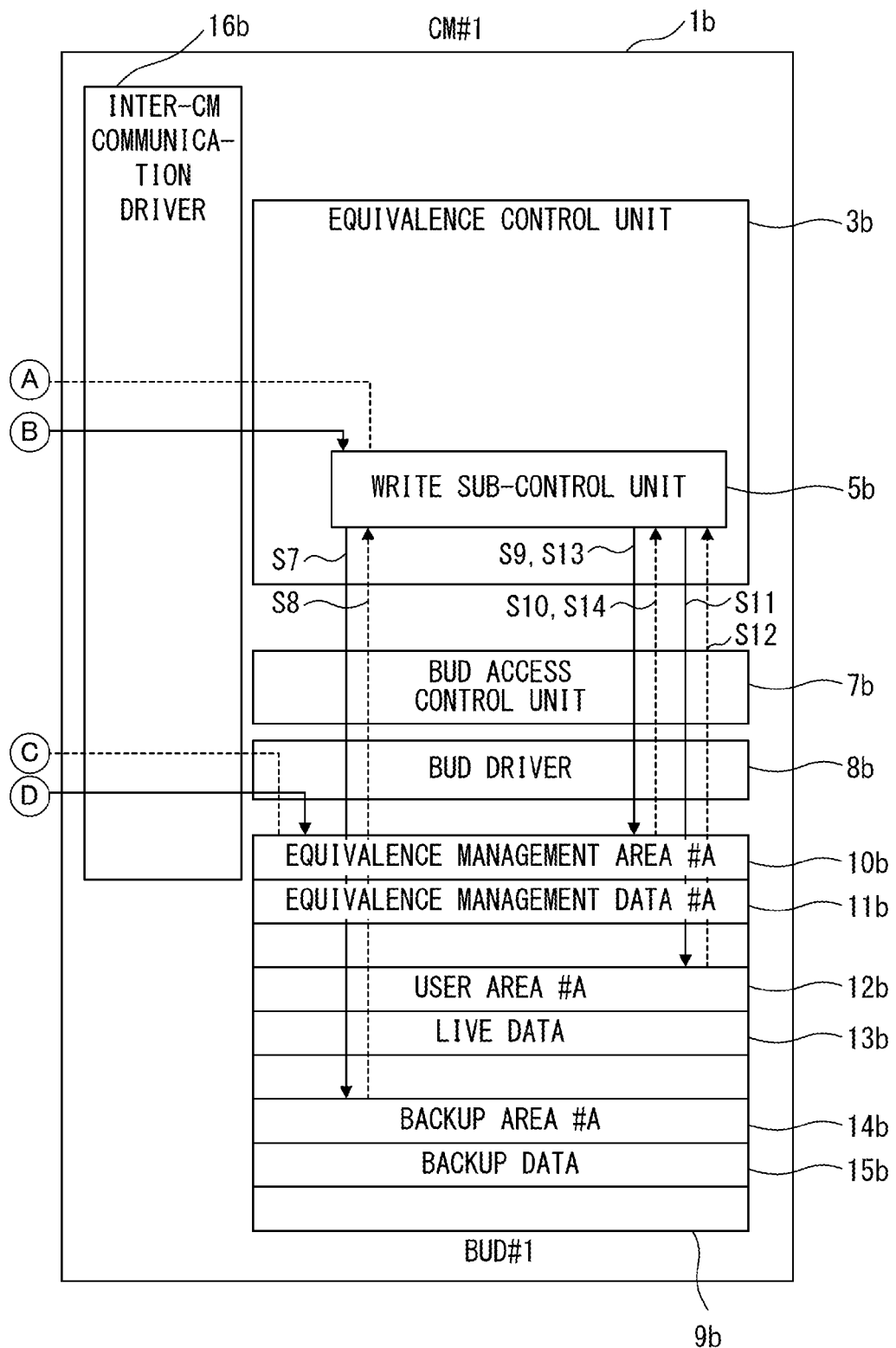

FIGS. 1A and 1B illustrate equivalence control for maintaining the data consistency among BUDs. A CM#0 (1a) and a CM#1 (1b) maintain the data consistency between a BUD 9a and a BUD 9b. The BUDs 9a and 9b include storage areas (user areas) 12a and 12b, equivalence management areas 10a and 10b, and backup areas 14a and 14b. The storage areas (user areas) 12a and 12b are accessed and used by functions of CMs la and 1b (functions #A, #B, #C . . . ), and store live data 13a and 13b. The equivalence management areas 10a and 10b and the backup areas 14a and 14b are storage areas to be used by equivalence control units 3a and 3b. Equivalence management data 11a and 11b for maintaining data consistency between the BUD 9a and the BUD 9b is stored in the equivalence management areas 10a and 10b. In view of the termination of firmware functions (e.g., termination of a power source) due to a failure that occurred during a data writing process, data to be written into a user area and an equivalence management area is backed up in the backup areas 14a and 14b on a temporary basis.

In FIGS. 1A and 1B, a reference sign "#A" is assigned to storage areas used by a BUD access function #A (hereinafter, this will be referred to as function #A). The CM#0 (1a) and CM#1 (1b) share a similar configuration, and thus only the CM#0 (1a) will be described below, and the description of the CM#1 (1b) will be omitted.

The CM#0 (1a) includes a function control unit 2a, an equivalence control unit 3a, a BUD access control unit 7a, a BUD driver 8a, and a BUD #0 (9a). The function control unit 2a exists for each of the functions of a CM (functions #A-N), and a function control unit for a BUD access function #A is illustrated in FIGS. 1A and 1B as an example. The function control unit 2a for the BUD access function #A is a control unit that executes an accessing process to the BUD 9a so as to realize the BUD access function #A.

The equivalence control unit 3a manages the data redundancy between the BUD 9a and the BUD 9b in an equivalence management area 10a. In particular, the equivalence control unit 3a uses equivalence management data, and manages the live data 13a of the user area used by each function so as to be equal between the BUD 9a and the BUD 9b. The equivalence control unit 3a backs up the live data 13a in the backup area 14a on a temporary basis, and retries to perform a writing process by using the live data. The equivalence control unit 3a includes a write control unit 4a, a write sub-control unit 5a, and an equivalence check control unit 6a.

The write control unit 4a is a main routine that controls a data write request command from the functions #A-#N to the BUDs 9a and 9b. The write sub control unit 5a is a subroutine that writes data in the storage area of the BUD 9a specified by each control unit.

The equivalence check control unit 6a checks whether the live data 13a and 13b stored in the storage area used by the functions #A-#N is in an equivalent state between the BUD 9a and the BUD 9b. When there is a BUD that is not in an equivalent state, the equivalence check control unit 6a performs a recovery process so as to achieve an equivalent state.

The BUD access control unit 7a performs logical address/physical address conversion on the address of an access destination. The BUD driver 8a is a driver that performs communication between the BUD 9a and the BUD 9b. An inter-CM communication driver 16a is a driver that performs communication with the other CM 1b.

The BUD 9a includes an equivalence management area (10a), a user area (12a), and a backup area (14a) that correspond to functions. In FIGS. 1A and 1B, an equivalence management area #A (10a), a user area #A (12a), and a backup area #A (14a) that correspond to the function #A are depicted by way of example.

In FIGS. 1A and 1B, when a write request command for the user areas #A of the BUDs 9a and 9b is received from the function #A (2a) (S1), the equivalence control unit 3a reads equivalence management data from the equivalence management area #A that corresponds to the function #A in the BUDs 9a and 9b. In other words, when a write request command is sent from the function #A to the equivalence control unit 3a (S1), the write control unit 4a sends an equivalence check request command to the equivalence check control unit 6a (S2). The equivalence check control unit 6a reads equivalence management data #A (11a) from the equivalence management area #A (10a) of the BUD #0 (9a) through the BUD access control unit 7a and the BUD driver 8a (S3, and S4). Moreover, the equivalence check control unit 6a reads the equivalence management data #A (11b) from the equivalence management area #A of the BUD #1 (9b) through the BUD access control unit 7a, the BUD driver 8a, the inter-CM communication drivers 16a and 16b, and a BUD driver 8b (S3, and S4).

Next, the equivalence check control unit 6a compares the equivalence management data of the BUDs 9a with that of the BUD 9b to check the presence of abnormality. When abnormal equivalence management data is present, the equivalence check control unit 6a sends the result of the check to the write control unit 4a (S5). The write control unit 4a requests that a recovery control unit (not illustrated) write the data of the normal BUD (recovery data) to the abnormal BUD (S6).

When a writing process is performed, for the purpose of preparing for the disconnection due to power failure or the like, the equivalence control units 3a and 3b (write sub-control units 5a and 5b) write the recovery data in the backup area as backup data (S7, and S8). The backup data includes writing information (writing destination and writing size), equivalence management data, and live data.

Then, the equivalence control units 3a and 3b (write sub-control units 5a and 5b) invalidate the equivalence management data before writing the live data, for recovery (S9, and S10). Subsequently, the equivalence control units 3a and 3b (write sub-control units 5a and 5b) write the live data in a specified position of the user area #A (S11, and S12). The equivalence control units 3a and 3b (write sub-control units 5a and 5b) validate the equivalence management data after the live data has been written (S13, and S14).

As described above, when a data write request command is sent from a function in a CM to an area of a BUD, a plurality of writing processes are performed for the BUD. The live data is written into the user area and the backup area, respectively, and it simply takes two or more times longer for its write processing time. Accordingly, it is impossible to ignore the overhead of the writing process even when a high-speed access device such as an SSD is used.

When CM maintenance (e.g., operation check of CM, integrating operation of CM) is performed, all the data in the user area being managed are copied. Thus, it takes a long time, and the time taken for integration tends to be long.

When a BUD is used for the first time, initialization is performed by writing data "0" to an area to be used, such that a BID (Block ID) error or the like will not occur in the initial reading process. Accordingly, as the capacity of the BUD becomes larger, the initialization of the BUD takes a longer time, and the time taken for integration tends to be longer.

Before and after a BUD is accessed by the functions in a CM through an equivalence control unit, exclusive control is performed for the purpose of preventing access competition to the user area by performing access lock/unlock for the user area of the BUD. As a result, a function control unit that uses an unlocked user area is able to access the BUD, but a function control unit that uses a locked user area is not able to access the BUD. Accordingly, access competition to BUDs is prevented, and it becomes possible to maintain data consistency among BUDs in the writing process.

A equivalence control unit controls the information stored in the area to be accessed due to an access request command from a function control unit so as to be in an equivalent state (i.e., the state in which the equivalence of data is achieved) among BUDs. The equivalent state among BUDs is checked by an equivalence control unit by checking the equivalence management data stored in an equivalence management area.

The equivalence management data is updated by alive data write request command to the relevant user area, and includes time stamp information at the time when an update is performed. The equivalence management data is invalidated before data is written into a user area, and is then validated at the time when a writing process has been completed. Accordingly, data is copied by an equivalence control unit from an area of a BUD where the equivalence management data is valid or an area of a BUD where the time stamp is new to an area of a BUD where the equivalence management data is invalid or an area of a BUD where the time stamp is old, thereby performing control such that the equivalent state will be maintained.

However, when power failure or sudden program shutdown occurs during a writing process, the equivalence management data of each area remains in an invalid state. As writing processes to BUDs are performed at the same time among CMs, data will be lost if there is no equivalence management data that is in a valid state at the timing of recovery.

In order to solve such problems, data is written into a backup area before the data is written into a user area. Even if sudden program shutdown occurs due to power failure or the like, a writing process is retried by using the data of the backup area when it is determined at the time of power restoration that a writing process was in progress.

Accordingly, it becomes possible to maintain the consistency of the record in the areas. A backup process is performed for every write request command in case of an unforeseeable event, and thus there is a trade-off between the backup process and the writing process performance.

There is a known system in which the data on a memory is backed up in a nonvolatile device when a power failure occurs. However, it is difficult to adopt such a system because it is requested to prepare memory space in view of the concurrent access from a number of functions and the maximum access size and it is a heavy load for the memory space.

An equivalence control unit is not aware of the data structure of the controlling area, and thus the equivalence control unit assumes that all the data in the user area are valid. For this reason, there is no choice but to copy all the data when data is copied from another normal BUD into the maintained BUD in CM maintenance or BUD maintenance, and thus it takes a long time for integration processes.

When the source data is not successfully read in a copying process, there is no choice but to abandon the entire area that was being copied even if the area from which data was not successfully read is an unused area, resulting in a data lost.

In view of the above problems, in the present embodiment, a writing process is performed in an efficient manner during the write access to a BUD, and thereby the writing process and the speed of the recovery process in CM integration or the like are attempted to be improved.

Figure 2:
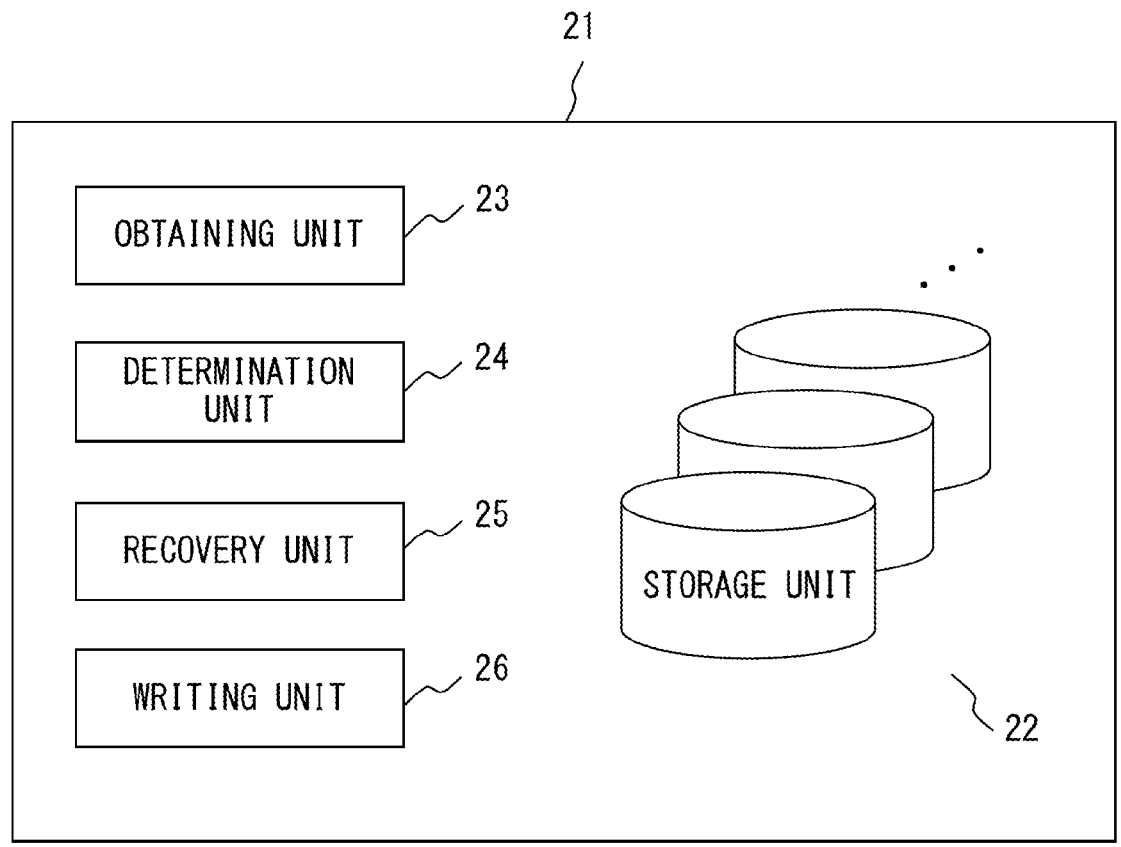
FIG. 2 illustrates an example of the storage control system according to the present embodiment.

FIG. 2 illustrates an example of the storage control system according to the present embodiment. A storage control system 21 includes a plurality of storage units 22, an obtaining unit 23, a determination unit 24, and a recovery unit 25.

Each of the storage units 22 includes the first storage area and the second storage area. The first storage area stores information. The second storage area stores management information. The management information includes attribute information of partition information that indicates how information is stored in the partitions obtained by partitioning the first storage area. A BUD 64 is an example of the storage unit 22. A user area 66 is an example of the first storage area. An equivalence management area 65 is an example of the second storage area. Equivalence management data is an example of the management information. Block attribute information is an example of the attribute information.

The obtaining unit 23 obtains management information from the storage units 2. An equivalence check control unit 59 is an example of the obtaining unit 23.

The determination unit 24 compares the obtained pieces of management information with each other to detect the presence of abnormal management information. The equivalence check control unit 59 is an example of the determination unit 24.

When the presence of abnormal management information is detected, the recovery unit 25 performs the following processes. Specifically, the recovery unit 25 reconfigures information to be stored in the first storage area of the storage unit 22 from which abnormal management information has been obtained for each unit of partition, by referring to any one of the storage units 22 from which normal management information has been obtained, based on the attribute information of normal management information in each partition. A recovery control unit 55 is an example of the recovery unit 25.

According to the configuration as described above, it becomes possible to perform recovery where the data consistency among storage devices is maintained, in an efficient manner. In other words, recovery for each unit of partition is enabled, and thus the time taken to perform recovery may be shortened.

The storage control system 21 further includes a writing unit 26. When there is a write request command for target information to the storage unit 22, the writing unit 26 writes the target information into the first storage area of the storage units 22. At that time, the writing unit 26 writes information indicating whether or not partition information is valid into the attribute information that corresponds to the partition of the area in which target information has been written in the management information stored in the second storage area of the storage units 22. A write control unit 53 is an example of the writing unit 26. In this case, the recovery unit 25 extracts partition information having attribute information that indicates that the partition information is valid, from any one of the storage units 22 from which normal management information has been obtained. Then, the recovery unit 25 stores the extracted partition information in the relevant partition of the first storage area of the storage unit 22 from which abnormal management information has been obtained.

According to the configuration as described above, it becomes possible to extract valid data in units of blocks from a BUD from which normal equivalence management data has been obtained, and to write the extracted data into the relevant block of a BUD to be recovered. By doing this, it becomes unnecessary to perform an extracting or writing process of invalid data, and thus the time taken to perform recovery may be shortened.

When there is a storage unit 22 in which a writing process has failed, the writing unit 26 writes information that indicates the need for recovery to be performed into the attribute information of the partition information stored in the partition corresponding to the accessing range specified by a write request command, where the attribute information of the partition information is included in the management information of the storage unit 22 at which a writing process has successfully been performed.

The recovery unit 25 extracts partition information having attribute information that indicates the need for recovery to be performed from the storage unit 22 at which a writing process has successfully been performed. The recovery unit 25 stores the extracted partition information in the relevant partition of the first storage area of the storage unit 22 at which a writing process has failed.

According to the configuration as described above, when recovery is to be performed, it has only to perform recovery for a block having attribute information that indicates the need for recovery to be performed, instead of performing recovery for the entirety of a user area. Thus, it becomes possible to shorten the time taken to perform recovery.

Note that the attribute information that indicates the need for recovery to be performed also serves as information identifying the storage unit 22 at which a writing process has failed. According to the configuration as described above, it becomes possible to specify a BUD to be recovered.

Attribute information includes the class information of the partition information. When there has been a write request command for the information to be written and when the class information included in the attribute information of the partition information stored in the partition corresponding to the accessing range specified by the write request command indicates metadata, the writing unit 26 performs the following processes. In other words, the writing unit 26 stores the information to be written in the first storage area and backup area of the storage unit 22. When the class information does not indicate metadata, the writing unit 26 stores the information to be written in the first storage area.

According to the configuration as described above, backup is performed when metadata is to be written, and backup is not performed when live data is to be written. As a result, the time taken to perform a writing process may be shortened.

FIG. 3 illustrates the hardware configuration of a storage system according to the present embodiment. A storage system 31 is a disk storage system in which two or more disk drives 39 are installed. In the example of FIG. 3, an access path exists to each of the disk drives 39 for the purpose of achieving redundancy, in regard to the access from a host computer (hereinafter, this will be referred to as host) 41 to the disk drives 39. The data is also distributed to several disks with the use of the RAID (Redundant Arrays of Independent Disks), where the data is stored in a redundant manner.

The storage system 31 includes a host 41, a fiber channel (FC) switch 42, a controller enclosure (CE) 32, and a drive enclosure (DE) 40. In the storage system 31, the drive enclosure (DE) 40 is connected to the host 41 via an FC switch 42 and a controller module (CM) 33.

The host 41 communicates with the CE 32 through the FC switch 42 so as to read data from the disk drives 39 held by the DE 40 or to write data into the disk drives 39. In FIG. 3, one host 41 is illustrated. However, a plurality of hosts 41 may be connected to the CE 32.

The CE 32 includes a plurality of CMs 33. The CMs 33 control the operation of the disk drives 39. The CMs 33 serve as storage control devices. The storage system 31 achieves redundancy by having two or more CMs 33.

The CMs 33 transmit an input/output (I/O) command to the DE 40 as access instruction information, and execute a data input/output command to the storage area of the disk drives 39. When no response has been received even after an access monitoring time has passed since the input/output command, the CMs 33 transmits an abort instruction command to the DE 40 to terminate the I/O processing.

The CM 33 includes a channel adapter (CA) 34, a CPU (Central Processing Unit) 35, a storage unit 36, a device adapter (DA) 37, and an inter-CM communication interface (I/F) 38. The channel adapter (CA) 34, the CPU 35, the storage unit 36, and the device adapter (DA) 37 are connected via an internal bus.

The CA 34 is connected to the host 41 through the FC switch 42. The CPU 35 controls the entirety of the CM 33. The inter-CM communication I/F 38 is an interface to communicate with another CM, and the inter-CM communication I/Fs 38 are connected to each other through a communication line.

The storage unit 36 is a device in which information such as a cache memory, a ROM (Read Only Memory), or a RAM (Random Access Memory) is stored. In the storage unit 36, data used to operate the CMs 33, a program according to the present embodiment and data used in the present embodiment, and the like are stored. The storage unit 36 includes a BUD.

The DA 37 is connected to the DE 40. The CPU 35 transmits and receives data to/from the DE 40 through the DA 37.

The DE 40 is provided with one or more DEs. The DE includes two or more disk drives 39, and has a RAID configuration where redundancy is taken into consideration.

Figure 4:
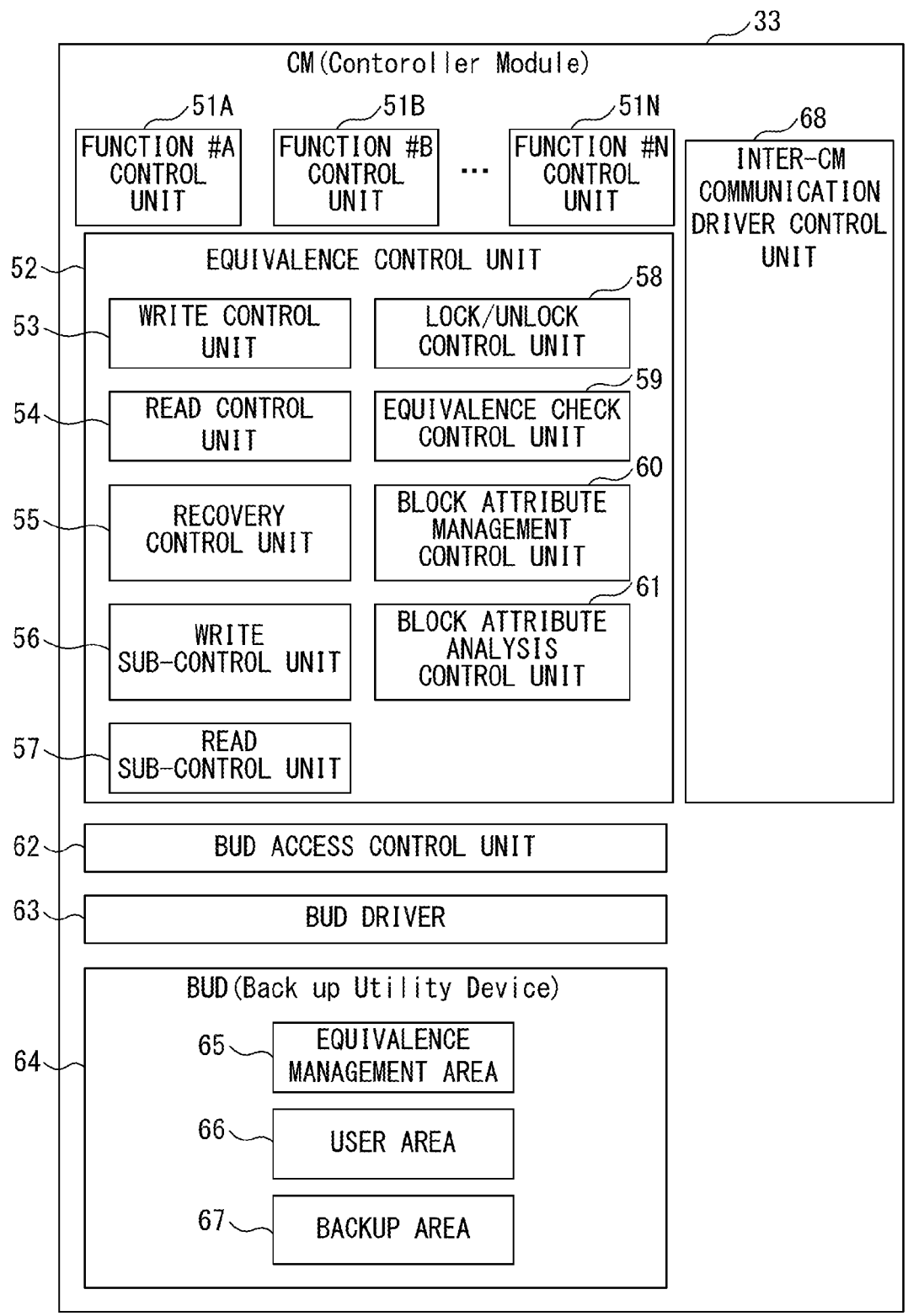
FIG. 4 illustrates a functional block diagram of a CM according to the present embodiment.

FIG. 4 illustrates a functional block diagram of a CM according to the present embodiment. The CM 33 includes function control units 51 (51A-51N), the equivalence control unit 52, a BUD access control unit 62, a BUD driver 63, the BUD 64, and an inter-CM. communication driver control unit 68.

The function control units 51 (function #A control unit 51A-function #N control unit 51N) use the areas of the BUD 64 so as to implement the respective functions. The function control units 51 include I/Fs through which the attribute of the block corresponding to the range that is accessed when a BUD is accessed is passed to the equivalence control unit 52. As will be described later, the term "block" refers to a partition obtained by dividing the user area 66 with a specified size. Accordingly, it becomes possible for the equivalence control unit 52 to be adapted to the function in which the function control units 51 dynamically set metadata/data.

The equivalence control unit 52 maintains the equivalent state of data among the BUDs 64 and manages the data in regard to the areas of the BUD 64 used by the function control units 51, and such control is realized by the CPU 35. The equivalence control unit 52 includes the write control unit 53, a read control unit 54, the recovery control unit 55, a write sub-control unit 56, a read sub-control unit 57, a lock/unlock control unit 58, the equivalence check control unit 59, a block attribute management control unit 60, and a block attribute analysis control unit 61.

The write control unit 53 is a main routine that controls a process performed for the write request commands from the function control units 51. The read control unit 54 is a main routine that controls a process performed for the read request commands from the function control units 51.

The recovery control unit 55 is a main routine that controls recovery at an area whose data is not in an equivalent state among the BUDs 64. The recovery control unit 55 reads data from the BUD 64 having normal data, and writes the read data to the BUD 64 having abnormal data.

The write sub-control unit 56 is a subroutine that writes data into the target area of the BUD 64 specified by the control units (53-55, 57-61). The read sub control unit 57 is a subroutine that reads data from the target area of the BUD 64 specified by the control units (53-55, 57-61).

The lock/unlock control unit 58 is a main routine that controls exclusion of the access from the function control units 51 to the BUD. When the function control unit 51 requests an access to the BUD, the lock/unlock control unit 58 allows an access by the function control unit from which an access request command has been sent, and limits an access by the function control units other than the function control unit from which an access request command has been sent. By doing this, exclusive control of accesses is achieved.

The equivalence check control unit 59 checks whether the data stored in the areas of the BUD 64 that are used by the function control units 51 is in an equivalent state among the BUDs 64. When there is the BUDs 64 not in an equivalent state, the equivalence check control unit 59 requests that the recovery control unit 55 perform a recovery process so as to achieve an equivalent state.

The block attribute management control unit 60 is a main routine that manages the attribute of the blocks in the user areas 66. The block attribute management control unit 60 creates block attribute information that includes the class of the data stored in a certain unit of blocks and valid/invalid attribute or the like in the user area 65 that is managed by the equivalence control unit 52. The block attribute management control unit 60 holds the created block attribute information as equivalence management data. In order to determine whether the block attribute is metadata or live data, the block attribute management control unit 60 includes an I/F to make an inquiry about the block attribute to the function control units 51. Accordingly, as long as an access lock is not set to the BUD, the block attribute management control unit 60 may obtain a block attribute from the function control units 51 when the block attribute has been changed. Accordingly, the block attribute management control unit 60 may rebuild block attribute mapping information according to the current data. The block attribute mapping information is the information used to manage the block attribute information in accordance with the blocks of a user area.

As will be described later, once data has been written, the block attribute of the area into which the data has been written changes to be valid. Assuming that it is not possible to obtain a block attribute from the function control units 51, when an area at which a writing process has been performed is later changed to an area not to be used, it is not possible for the equivalence control unit 52 to determine that the area is no longer used, i.e., that the area is invalid. On the other hand, according to the present embodiment, an equivalence control unit may obtain a block attribute from the function control units 51. For this reason, even in the above case, the equivalence control unit 52 may change the block attribute of the equivalence management data from a "valid" attribute to an "invalid" attribute based on the obtained block attribute.

When there is an access request command from the control units (53-60), the block attribute analysis control unit 61 determines the attribute of the block that corresponds to the accessing range.

When there is an access request command from the control units to the BUD 64, the BUD access control unit 62 converts the address of an access destination between a logical address and a physical address. The BUD driver 63 is a driver that communicates with the BUD 64. The BUD 64 includes the equivalence management area 65, the user area 66, and a backup area 67.

Figure 5:
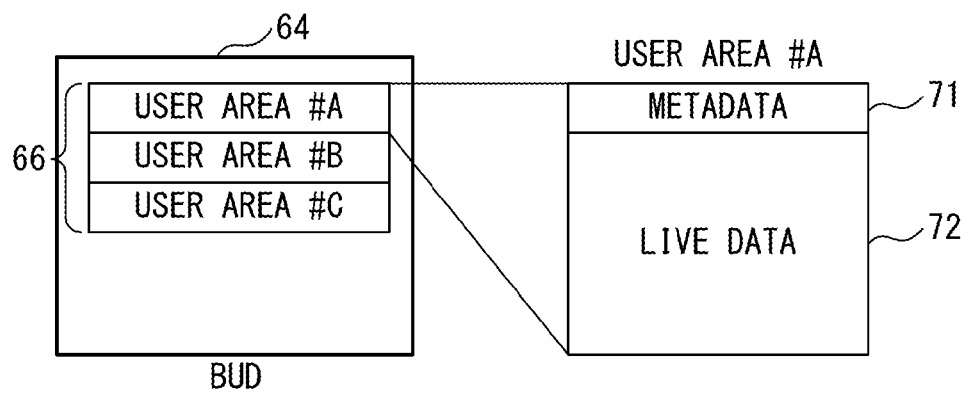
FIG. 5 illustrates an example of the user area according to the present embodiment.

FIG. 5 illustrates an example of the user area according to the present embodiment. The BUD 64 includes areas (user areas) that correspond to the function control units 51. Metadata 71 and live data 72 are stored in the user area 66 of the BUD 64. The function control units 51 in the CMs 33 that access the BUD 64 (in particular, a function to use an area with greater capacity) hold function-specific metadata 71 (i.e., information that indicates what data is stored in what address).

Validation of the written live data (maintenance of integrity) or invalidation of live data (abandoning, overwriting) is managed by using metadata, and thus the metadata is updated when the live data is to be written. In other words, unless the live data is valid in the metadata, the live data is treated as invalid data. That is to say, the consistency of the live data may be maintained by protecting the metadata. Accordingly, the writing process to the backup area 67 may be done to the metadata.

When the range of the metadata stored in the user area 66 is known, the metadata maybe read, and it is possible to determine where the valid live data is stored in the user area. Accordingly, it becomes possible to copy the minimum data from the source in the data copy processing in the maintenance of the CMs 33, the maintenance of the BUD 64, or the like.

As a result, the time taken to integrate a CM may be shortened, or the determination of data abandonment may become possible when the source data has failed to be read.

A configuration in which the metadata in the user areas is protected and a write access process and a read recovery process are performed in a sufficient manner, which is achieved by using equivalence management data and managing the data attribute in the user areas by using the equivalence control unit 52, will be described.

Figure 6:
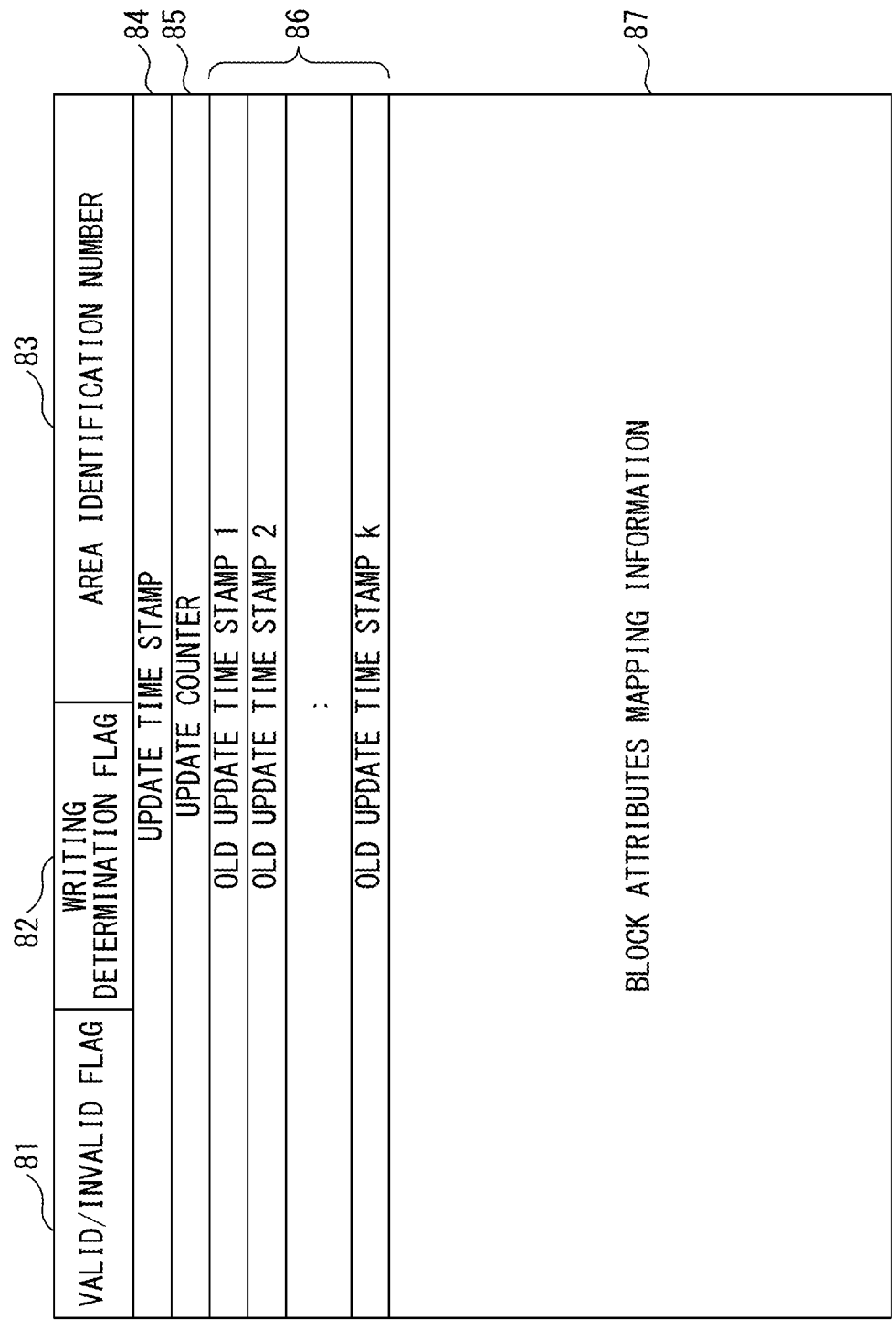
FIG. 6 illustrates the data structure of equivalence management data according to the present embodiment.

FIG. 6 illustrates the data structure of equivalence management data according to the present embodiment. The equivalence management data is data for the management of the data consistency among the BUDs 64 in a unit of user area, and is used to manage the information (management data) stored in the user areas 66. The equivalence management data is stored in the equivalence management area 65.

The equivalence management data includes a valid/invalid flag 81, a writing determination flag 82, an area identification number 83, an update time stamp 84, an update counter 85, an old update time stamp 86, and block attribute mapping information 87.

The valid/invalid flag 81 is a flag that indicates whether the relevant equivalence management data is valid or invalid.

The writing determination flag 82 is a flag that determines whether data is being written into the user area that corresponds to the relevant equivalence management data. The writing determination flag 82 is turned ON when a writing process starts, and is turned OFF when the writing process is complete.

The area identification number 83 is a number that identifies the user area being used by the function control units 51.

The update time stamp 84 is information that indicates the time at which the information (management data) stored in the relevant user area 66 was updated. The update time stamp 84 is updated by a writing process.

The update counter 85 is information that indicates the number of times the relevant management data has been updated, and is supplementary information of the update time stamp 84. The update counter 85 takes a count when the update time stamp 84 is the same as that of the management data of the corresponding user area between the BUDs 64.

The old update time stamp 86 indicates the information of the update time stamp immediately previous to the update time stamp 84, and the old update time stamp 86 is set when data equivalence is not successfully achieved between the BUDs 64. The old update time stamp 86 includes an old update time stamp 1 (86-1), an old update time stamp 2 (86-2), . . . , and an old update time stamp k (86-k) (k: any integer).

The block attribute mapping information 87 may have any block length, and is mapping information used to manage block attributes. In particular, the block attribute mapping information 87 is the mapping information obtained by dividing the relevant user area into blocks with a specified size, and by attaching attribute information to each of the divided blocks. The block attribute mapping information 87 will be described later in detail with reference to FIGS. 7A and 7B.

Figure 7A:
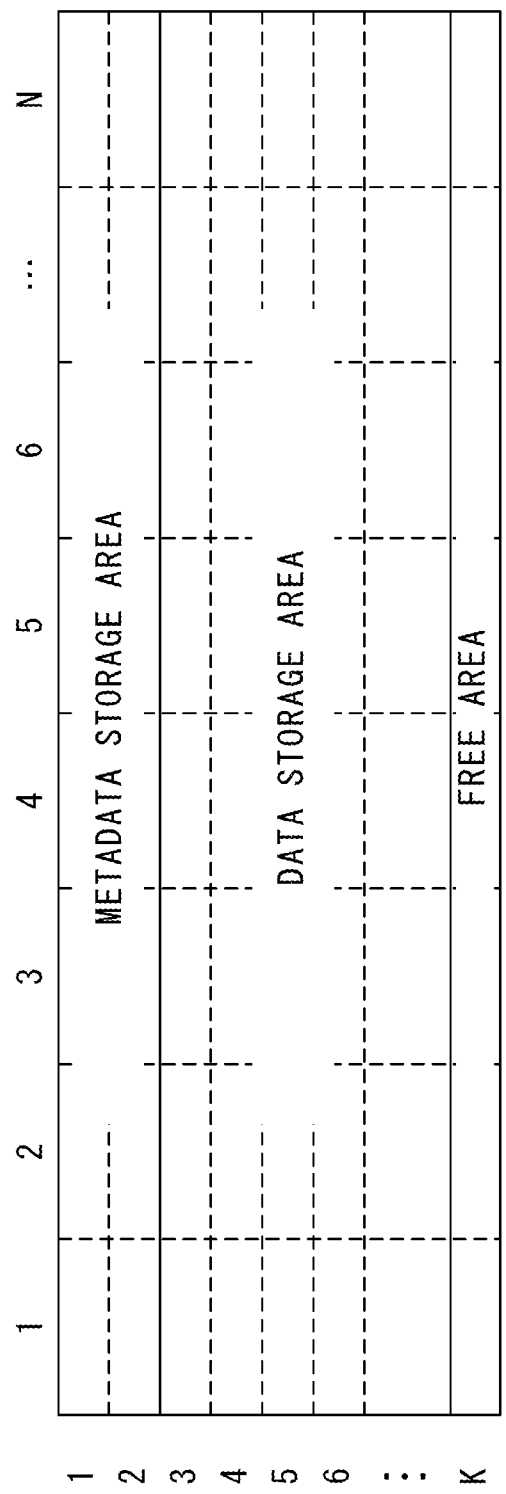

FIGS. 7A and 7B illustrate block attribute mapping information according to the present embodiment. FIG. 7A illustrates a user area divided into blocks with a specified size. FIG. 7B illustrates block attribute mapping information in which the blocks forming the user area are mapped.

As illustrated in FIG. 7A, a user area includes a storage area in which metadata is stored (metadata storage area), a storage area in which live data is stored (data storage area), and an unused storage area (free area). A user area is divided into partitions (blocks) with a specified size, and is managed. As illustrated in FIG. 7B, the blocks forming the user area are mapped in the block attribute mapping information, and the block attribute mapping information contains the attribute information of each block.

In the block attribute mapping information 87, the position defined by "Block (Column)" and "Block (Raw)" corresponds to the position that specifies the corresponding block in the relevant user area. As illustrated in FIG. 7B, at the position of the block defined by "Block (Column)" and "Block (Raw)" in the block attribute mapping information 87, the attribute information of the block is stored.

Figure 8:
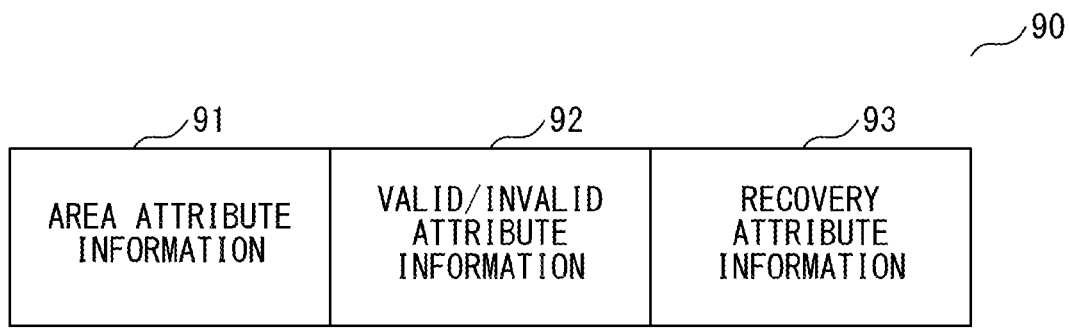
FIG. 8 depicts the data structure of block attribute information according to the present embodiment.

FIG. 8 depicts the data structure of block attribute information according to the present embodiment. The block attribute information includes "area attribute information" 91, "valid/invalid attribute information" 92, and "recovery attribute information" 93.

In the "area attribute information" 91, the information that indicates the attribute of the information stored in the relevant block of a user area is stored. In particular, "meta (M)", "data (D)", and "free (F)" are stored in the "area attribute information" 91. "Meta (M)" indicates the storage area of metadata of the live data stored in the area that corresponds to the relevant block. "Data (D)" indicates the storage area for the live data stored in the area that corresponds to the relevant block, and indicates that the information is to be managed by the metadata. "Free (F)" indicates that the area corresponding to the relevant block is an empty area (unused area).

In the "valid/invalid attribute information" 92, "valid (V)" or "invalid (I)" is stored. "Valid (V)" indicates that the relevant block holds valid information. "Invalid (I)" indicates that the relevant block does not hold valid information.

In the "recovery attribute information" 93, information used to identify the BUD 64 in which the equivalent state has failed to be maintained and a recovery process is to be performed, among a plurality of BUDs 64, is stored.

Next, the operation of an equivalence control unit will be described.

<Initial Startup of Storage Device>

FIG. 9 illustrates an operational flow of the equivalence control unit at an initial startup of the storage device according to the present embodiment. When the storage device is not at an initial startup ("NO" in S20), the present flow is terminated. When the storage device is at an initial startup ("YES" in S20), the equivalence control unit 52 requests that the function control units 51 that correspond to the user areas create initial data to be written (S21). The initial data to be written indicates metadata to be stored in a user area at the time of initial startup.

The equivalence control unit 52 makes an inquiry to the function control units 51, and creates initial block attribute mapping information that indicates the block attribute mapping information at the time of initial startup, and initial equivalence management data that indicates the equivalence management data at the time of initial startup (S22, and S23).

The equivalence control unit 52 writes the initial data to be written (metadata) and the initial equivalence management data into each BUD (S24, and S25). The processes of S21 to S25 are repeated for each user area (S26). From then on, the access to the BUD 64 by the function control units will be allowed.

Figure 10:
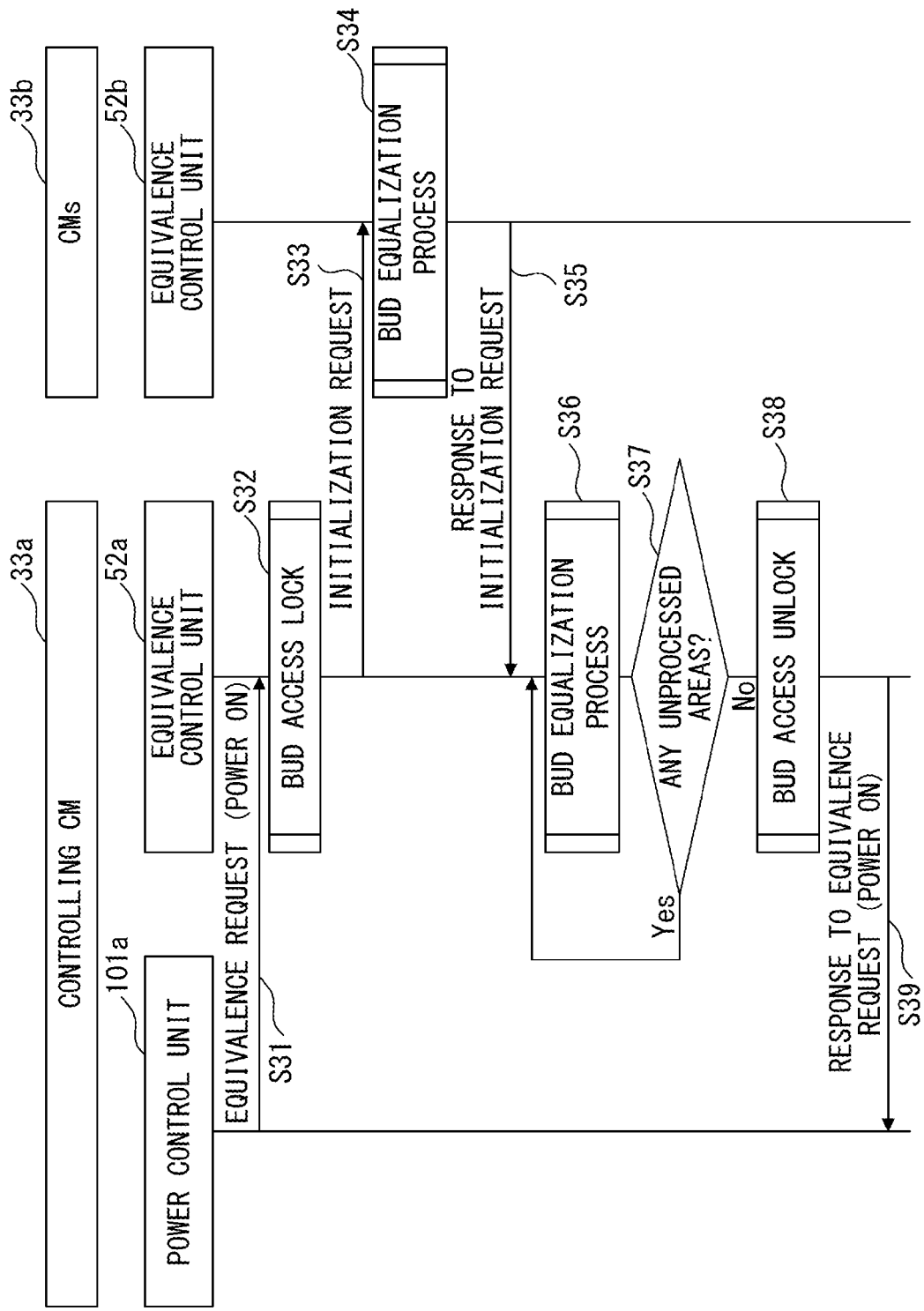
FIG. 10 is a general view of the operation sequence between CMs at an initial startup of the storage device according to the present embodiment.

FIG. 10 is a general view of the operation sequence between CMs at an initial startup of the storage device according to the present embodiment. For the sake of explanation, an index "a" will be given to the elements related to the configuration of a CM that performs a control process (controlling CM), and an index "b" will be given to the other elements of the configuration of a CM.

When the power source is turned on, a power control unit 101a in a controlling CM 33a sends an equivalence request command to the equivalence control unit 52a for the execution of equivalence control (S31).

When an equivalence request command is received, the equivalence control unit 52a performs exclusive control on the access between the BUDs 64, and performs access lock on the BUD 64 (S32). The access lock indicates exclusive control on the access between the BUDs 64, where the equivalence control unit 52*a* restricts the access to the user area of the BUD 64 by function control units other than a specified function control unit. Subsequently, the equivalence control unit 52*a* sends an initialization request command to CMs 33*b* so as to initialize the BUD 64 (S33).

When the initialization request command is received, the equivalence control units 52*b* of the CMs 33*b* perform an initialization process on the BUD 64 (S34). In the initialization process, whether or not the BUD 64 is at an initial startup is determined. When it is determined that the BUD 64 is at an initial startup, the initialized block attribute mapping information and equivalence management data are created. Moreover, system management data is created for the BUD 64 provided for the present storage device. After the BUD 64 is initialized, the equivalence control unit 52*b* responds to the initialization request command from the controlling CM 33*a* (S35).

When a response to the initialization request command has been received, the equivalence control unit 52*a* of the controlling CM 33*a* performs an equalization process in which the data of the user areas of the BUDs 64 are equalized (S36). While there is unprocessed user area ("YES" in S37), the equivalence control unit 52*a* keeps performing an equalization process (S36).

When an equalization process has been completed for all the user areas on the BUD 64 ("NO" in S37), the equivalence control unit 52*a* performs exclusive control on the access to the BUD 64, and releases the access lock to the BUD 64 (S38). The equivalence control unit 52*a* sends an equivalence response to the power control unit 101*a*, thereby notifying the power control unit 101*a* of the completion of the equivalence control (S39).

Next, the initialization process on the BUD 64 (S34), which has been described with reference to FIG. 10, will be described in detail with reference to FIG. 11.

Figure 11A:
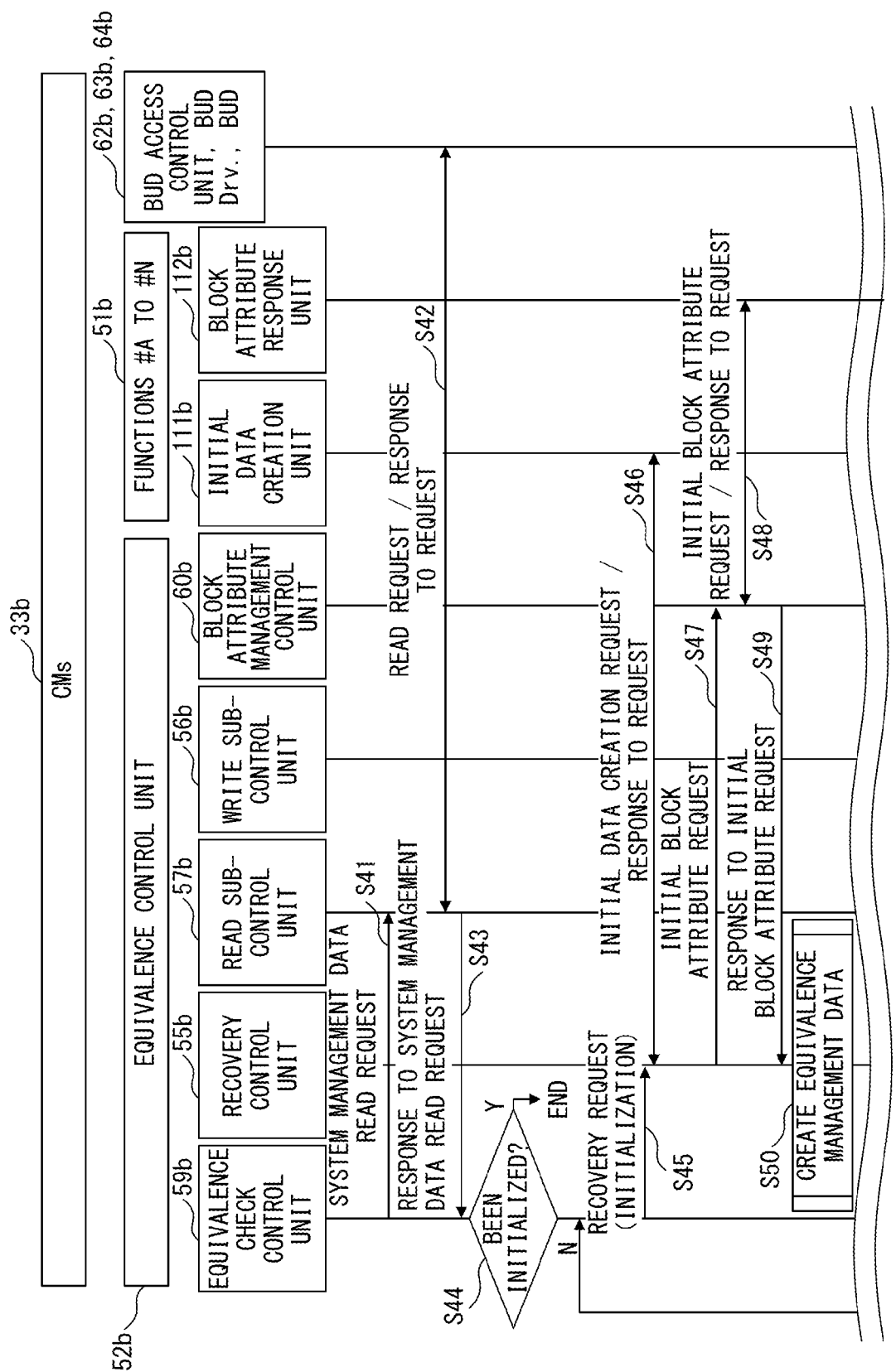
FIG. 11A is a detailed sequence diagram (1) of the BUD initialization process (S34) according to the present embodiment.
Figure 11B:
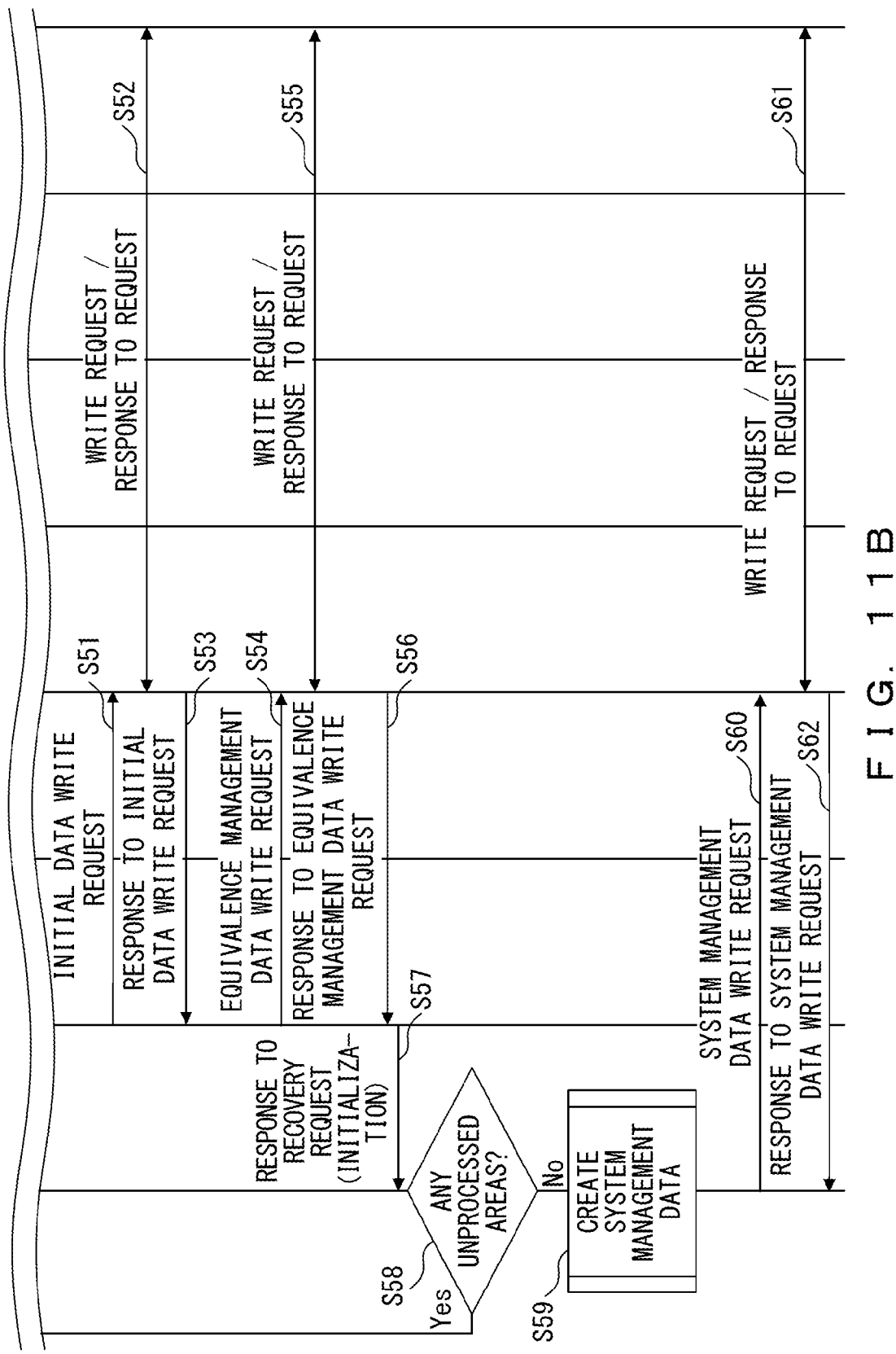
FIG. 11B is a detailed sequence diagram (2) of the BUD initialization process (S34) according to the present embodiment.

FIG. 11A and FIG. 11B are detailed sequence diagrams of the BUD initialization process (S34) according to the present embodiment. When an initialization request command is received from the equivalence control unit 52*a* of the controlling CM 33*a*, the equivalence control unit 52*b* of the CMs 33*b* performs the following processes in S34.

Firstly, an equivalence check control unit 59*b* sends a read request command to the BUD 64*b* through a read sub-control unit 57*b*, a BUD access control unit 62*b*, and a BUD driver 63*b*, and reads system management data from the BUD 64*b* (S41, S42, and S43). Here, the system management data indicates information that is unique to each storage device, and indicates information used to manage the BUD 64 that each storage device has. The system management data includes information that indicates whether or not a storage device is at initial startup.

The equivalence check control unit 59*b* determines whether the BUD has been initialized based on the read system management data (S44). When the system management data is referred to and it is determined that an initialization process has been completed ("YES" in S44), the equivalence check control unit 59*b* terminates the initialization process (S34). When the system management data is referred to and it is determined that an initialization process has not yet been performed ("NO" in S44), the equivalence check control unit 59*b* sends a recovery request command to a recovery control unit 55*b* so as to form a default equivalent state (S45).

The recovery control unit 55*b* requests that a function control unit 51*b* create initial data for the user area that is used by the function control unit 51*b*. When an initial data creation unit 111*b* of the function control unit 51*b* receives a request to create initial data, the initial data creation unit 111*b* creates default metadata of the user area that is used by the function control unit 51*b* as initial data, and returns the created data to the recovery control unit 55*b* (S46).

The recovery control unit 55*b* requests that a block attribute response unit 112*b* of the function control unit 51*b* through a block attribute management control unit 60*b* provide initial block attribute mapping information (S47, and S48). The initial block attribute mapping information indicates the initialized block attribute information that corresponds to the blocks of the user area that is used by the function control unit 51*b*.

The block attribute response unit 112*b* returns the attribute information of the blocks of the user area that is used by the present function control unit 51*b* to the block attribute management control unit 60*b*. The block attribute management control unit 60*b* creates information in which a block attribute is mapped onto the blocks of the user area that is used by the present function control unit 51*b* (block attribute mapping information) from the block attribute information. The block attribute management control unit 60*b* returns the initial block attribute mapping information to the recovery control unit 55*b* (S49).

The recovery control unit 55*b* creates the initialized equivalence management data (initial equivalence data) that corresponds to the user area used by the present function control unit 51*b*, in which the initial block attribute mapping information is included (S50).

The recovery control unit 55*b* writes the initial data (metadata) into the user area that is used by the present function control unit 51*b* in the BUD 64*b*, via a write sub-control unit 56*b*, the BUD access control unit 62*b*, and the BUD driver 63*b* (S51, S52, and S53).

The recovery control unit 55*b* writes initial equivalence management data into the equivalence management area of the BUD 64*b* via the write sub-control unit 56*b*, the BUD access control unit 62*b*, and the BUD driver 63*b* (S54, S55, and S56). The recovery control unit 55*b* responds to the recovery request command from the equivalence check control unit 59*b* (S57).

When there is an unprocessed user area in the BUD ("YES" in S58), the equivalence check control unit 59*b* returns the process to S45.

When the user areas that are used by the function control units 51*b* have been all processed ("NO" in S58), the equivalence check control unit 59*b* updates the system management data that is used to manage the BUD held by each storage device (S59). The equivalence check control unit 59*b* sends a system management data write request command to the BUD 64*b* via the write sub-control unit 56*b*, the BUD access control unit 62*b*, and the BUD driver 63*b* (S60, S61, and S62).

Next, the equalization process in which the equivalent state of the data of the user areas of the BUDs has been maintained (S36), which has been described with reference to FIG. 10, will be described in detail with reference to FIG. 12A, FIG. 12B, and FIG. 12C.

Figure 12A:
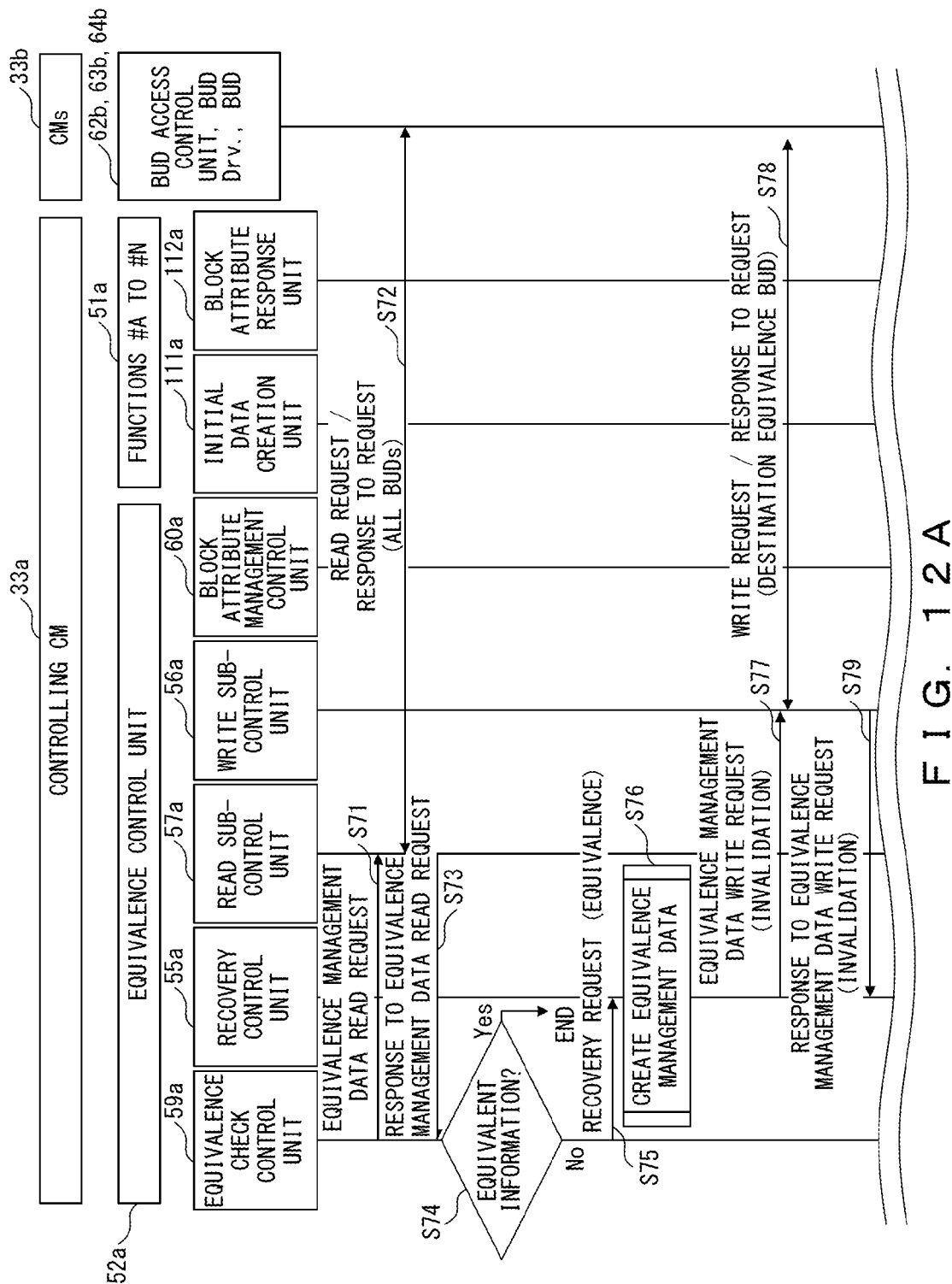
FIG. 12A is a detailed sequence diagram (1) of the inter-BUD equalization process (S36) according to the present embodiment.
Figure 12B:
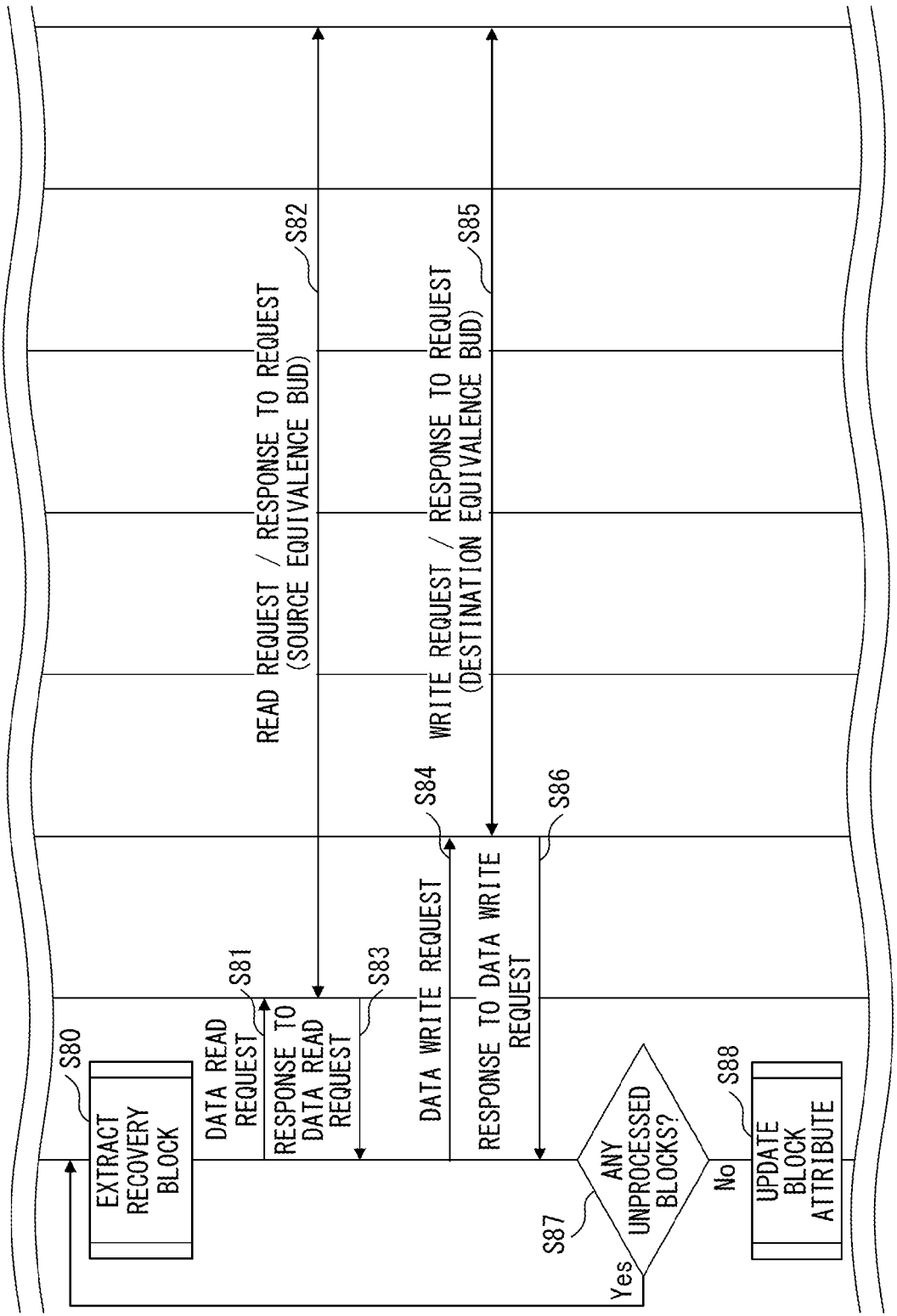
FIG. 12B is a detailed sequence diagram (2) of the inter-BUD equalization process (S36) according to the present embodiment.
Figure 12C:
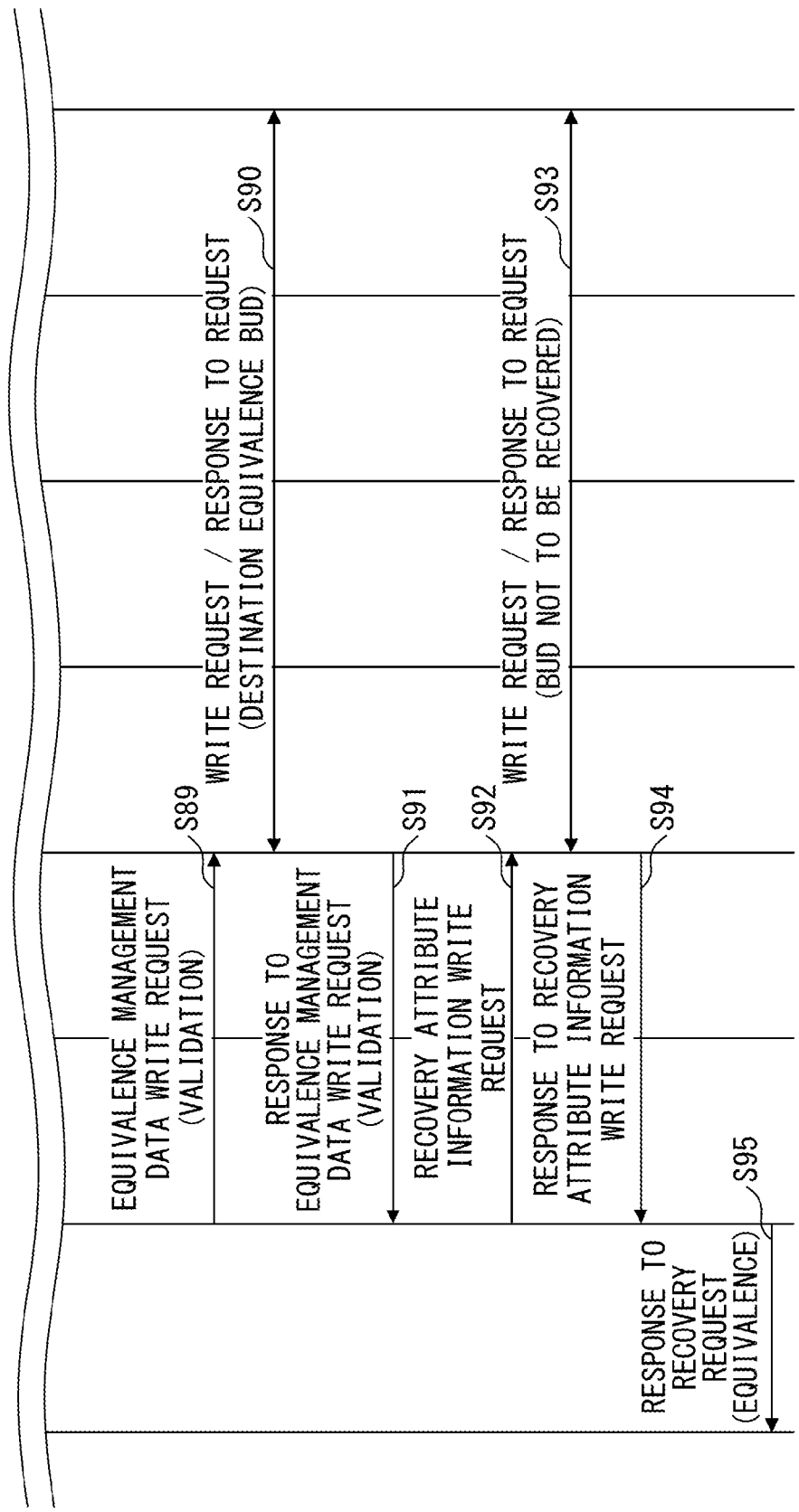
FIG. 12C is a detailed sequence diagram (3) of the inter-BUD equalization process (S36) according to the present embodiment.

FIG. 12A, FIG. 12B, and FIG. 12C are detailed sequence diagrams of the inter-BUD equalization process (S36) according to the present embodiment. In S36, when a response to the initialization request command is received from the equivalence control unit 52*b* of the CMs 33*b*, the equivalence control unit 52*a* of the controlling CM 33*a* performs the following processes.

Firstly, the equivalence check control unit 59*b* sends read request commands to the BUDs 64*b* via the read sub-control unit 57*b*, the BUD access control unit 62*b*, and the BUD driver 63b, and reads the equivalence management data from all the BUDs 64b (S71, S72, and S73).

An equivalence check control unit 59a determines whether the equivalent state of the equivalence management data received from the BUDs 64 has been maintained. In other words, the equivalence check control unit 59a compares the update time stamps with the update counters of the equivalence management data read from the BUDs 64, and determines whether the update time stamps and the update counters are equal to each other.

When the update time stamps and the update counters of the equivalence management data read from the BUDs 64 are equal to each other ("YES" in S74), the equivalence check control unit 59a determines that all the equivalence management data is in a normal state (i.e., equivalent state), and terminates the processes of the present sequence.

When the update time stamps or the update counters of the equivalence management data read from the BUDs 64 are not equal to each other ("NO" in S74), it is determined that some BUDs are to be recovered, and the equivalence check control unit 59a sends a recovery request command to a recovery control unit 55a (S75). Here, the recovery control unit 55a sets the equivalence management data in which the update time stamp is the latest, or the equivalence management data in which the update time stamp is the latest and the value of the update counter is the greatest, in the equivalence management data compared in S74, to the standard equivalent state. Note that a BUD in the standard equivalent state will be referred to as a source equivalence BUD. Moreover, note that a BUD whose equivalent state is to be achieved in accordance with the source equivalence BUD, i.e., a BUD to be recovered, will be referred to as a destination equivalence BUD.

The recovery control unit 55a creates equivalence management data (S76). Here, the recovery control unit 55a overwrites the equivalence management data of a BUD to be recovered (destination equivalence BUD) with the equivalence management data of the source equivalence BUD. The recovery control unit 55a invalidates the equivalence management data by performing an update "valid/invalid flag ="invalid"" via a write sub-control unit 56a, the BUD access control unit 62b, and the BUD driver 63b (S77, S78, and S79).

The recovery control unit 55a extracts a piece of block attribute information from the block attribute mapping information of the equivalence management data of the source equivalence BUD (S80). The recovery control unit 55a reads the information that corresponds to the extracted block attribute information from the corresponding user area of the source equivalence BUD via the BUD access control unit 62b and the BUD driver 63b (S81, S82, and S83).

The recovery control unit 55a writes the information read from the source equivalence BUD into the destination equivalence BUD 64 via the write sub-control unit 56a, the BUD access control unit 62b, and the BUD driver 63b (S84, S85, and S86).

When an unprocessed block is present in the block attribute mapping information of the equivalence management data of the source equivalence BUD ("YES" in S87), the recovery control unit 55a returns the process to S80.

When the process has been completed for all the blocks of the block attribute mapping information of the equivalence management data of the source equivalence BUD ("NO" in S87), the recovery control unit 55a clears the recovery attribute information included in the block attribute information of the equivalence management data of the BUDs to "0" (S88).

The recovery control unit 55a updates the valid/invalid flag of the equivalence management data including the block attribute mapping information updated in S88 to "valid" via the write sub-control unit 56a, the BUD access control unit 62b, and the BUD driver 63b. Then, the recovery control unit 55a validates the equivalence management data (S89, S90, and S91).

Moreover, the recovery control unit 55a updates the recovery attribute of the block attribute of the equivalence management data of the BUD 64b not to be recovered to "0" via the write sub-control unit 56a, the BUD access control unit 62b, and the BUD driver 63b (S92, S93, and S94). The equivalence check control unit 59a receives a response to the recovery request command from the recovery control unit 55a (S95).

As described above, when the user area that is used by a function control unit is initialized at initial startup of a storage device, an equivalence management unit 52 creates initial data for equivalence management data, and stores the created initial data in the BUDs 64. According to the present embodiment, the data stored in a user area is managed by equivalence management data, and thus only the initialization of logical information (equivalence management data) is sufficient. Accordingly, initialization in which "0" is written to all the areas of a user area is unnecessary.

<Cases in Which Reading Process from BUD is Performed by Function Control Units>

FIG. 13 illustrates an operational flow of the equivalence control unit when a reading process from a BUD is performed by function control units, according to the present embodiment. When a read request command is received from function control unit 51, the equivalence control unit 52 reads the equivalence management data from the BUDs 64 (S101).

The equivalence control unit 52 compares the equivalence management data read from the BUDs 64 with itself, and determines whether there is a BUD whose equivalence management data is not consistent (S102). In other words, the equivalence control unit 52 compares the update time stamps with the update counters of the equivalence management data read from the BUDs 64, and determines whether the update time stamps and the update counters are equal to each other.

When the update time stamps or the update counters of the equivalence management data read from the BUDs 64 are not equal to each other ("Yes" in S102), the equivalence control unit 52 performs a recovery process (S103).

When the update time stamps and update counters of the equivalence management data read from the BUDs 64 are equal to each other ("No" in S102), the equivalence control unit 52 performs the following process. Specifically, the equivalence control unit 52 determines the validity of the attribute information of the block that corresponds to the accessing range for which a read request command has been sent from the function control unit 51, by using the block attribute mapping information of the equivalence management data (S104).

In S104, when the attribute information of the block that corresponds to the accessing range indicates an "invalid (I)" attribute or a "free (F)" attribute ("YES" in S104), the equivalence control unit 52 performs the following process.

Specifically, the equivalence control unit 52 creates the data for which padding with zero is performed, which corresponds to the accessing range, as the read data without directly reading the data from the BUD 64, and responds to the function control unit 51 from which the read request command was sent (S105, and S107).

In S104, when a block attribute that includes a "valid (V)" attribute is present in the attribute information of the block that corresponds to the accessing range ("No" in S104), the equivalence control unit 52 changes the accessing range. Specifically, the equivalence control unit 52 reads the data of a block having a "valid (V)" attribute (i.e., the block from which the blocks having "invalid (I)" attributes and "free (F)" attributes are excluded) in the accessing range from a user area (S106, and S107).

Figure 14:
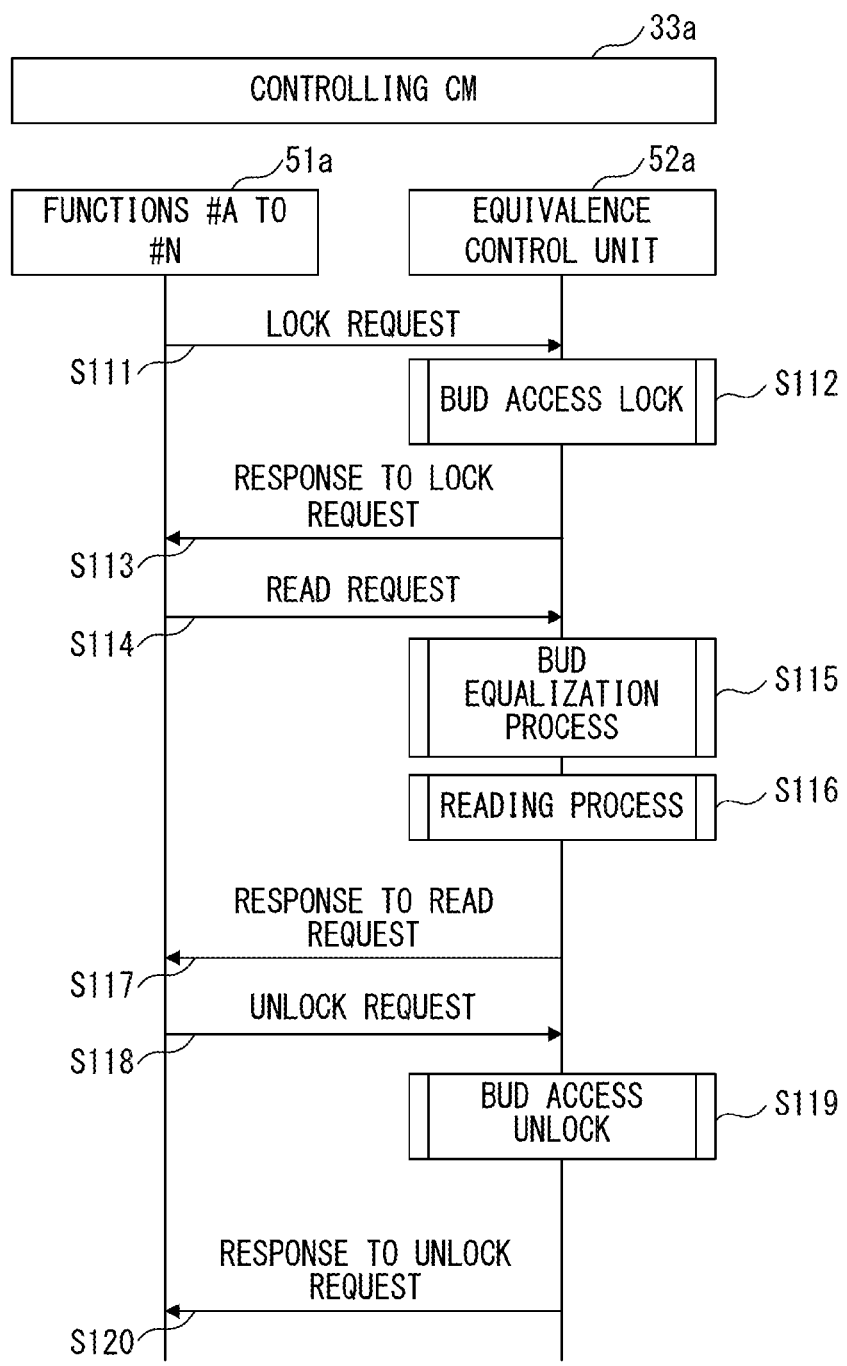
FIG. 14 is a general view of the operation sequence between CMs when a reading process from a BUD is performed by a function control unit, according to the present embodiment.

FIG. 14 is a general view of the operation sequence between CMs when a reading process from a BUD is performed by a function control unit, according to the present embodiment.

A function control unit 51a in the controlling CM 33a sends a BUD access lock request command to the equivalence control unit 52a (S111).

When the BUD access lock request command is received, the equivalence control unit 52a performs exclusive control on the access between the BUDs, and performs BUD access lock (S112). The equivalence control unit 52a returns the completion of the access lock to the function control unit from which the request command was sent (S113).

The function control unit 51a sends a data read request command to the equivalence control unit 52a (S114). The equivalence control unit 52a performs an equalization process on the data of the user areas of the BUDs such that the equivalent state will be maintained (S115). S115 is similar to S36 of FIG. 10 and FIGS. 12A-12C, and thus the description of S115 will be omitted.

Subsequently, the equivalence control unit 52a reads the data requested by the function control unit 51a (S116), and returns the read data to the function control unit 51a from which the read request command was sent (S117).

When the read data is received, the function control unit 51a sends a BUD access unlock request command to the equivalence control unit 52a (S118). The equivalence control unit 52a performs exclusive control on the access to the BUD, and releases the access lock to the user area of the BUD (S119). The equivalence control unit 52a responds to the BUD access unlock request command (S120).

Figure 15:
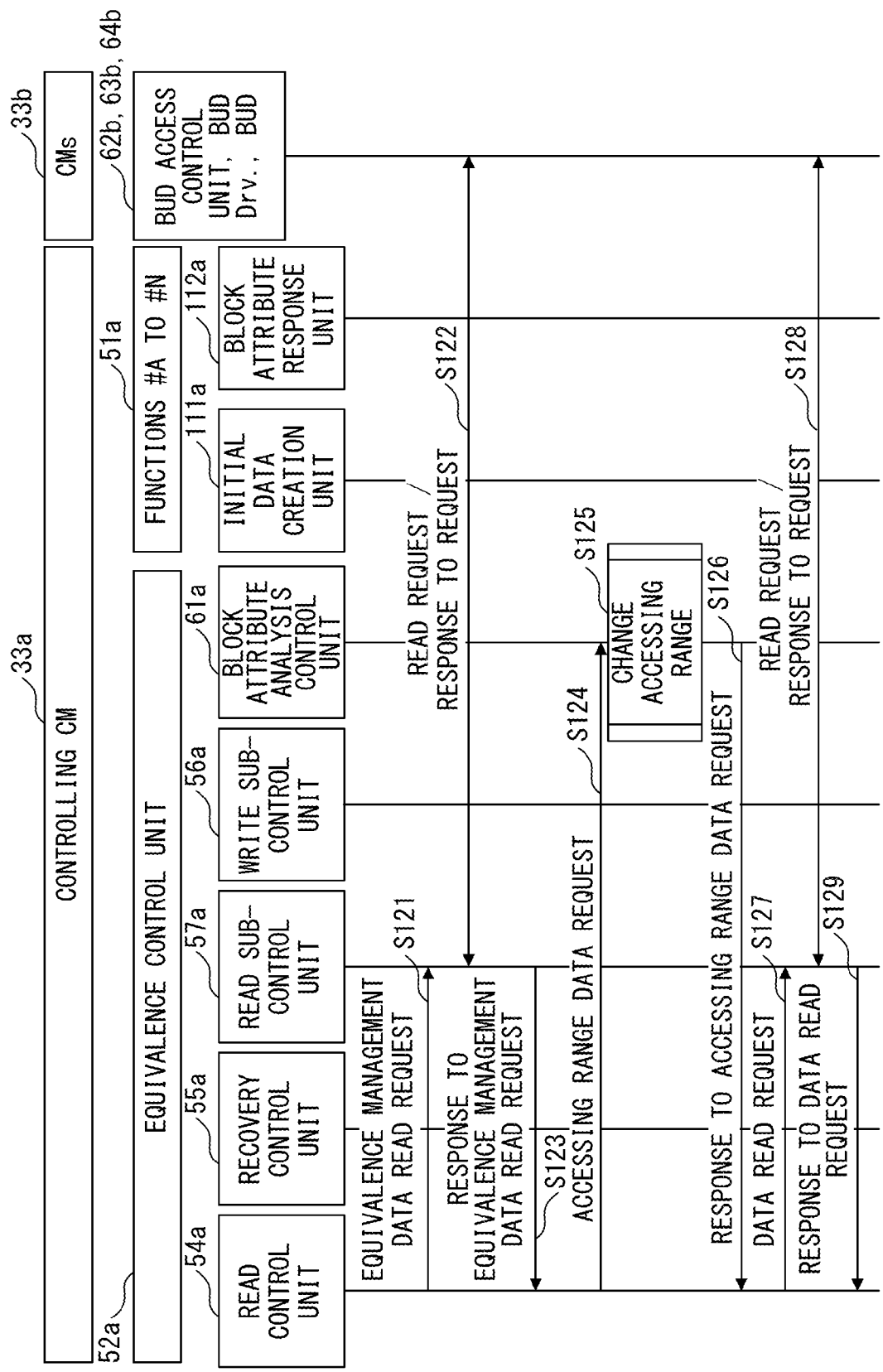
FIG. 15 is a detailed sequence diagram of the reading process (S116) according to the present embodiment.

FIG. 15 is a detailed sequence diagram of the reading process (S116) according to the present embodiment. In S116, the equivalence control unit 52a of the controlling CM 33a performs the following processes according to the read request command from the function control unit.

Firstly, the read control unit 54 reads the equivalence management data that corresponds to the user area used by the function control unit from which the write request command was sent from the BUD 64 via a read sub-control unit 57a, the BUD access control unit 62b, and the BUD driver 63b (S121, S122, and S123).

The read control unit 54 requests that a block attribute analysis control unit 61a provide accessing range data that indicates the accessing range of the user area where a reading process is performed (S124). When the accessing range data request command is received, the block attribute analysis control unit 61a reads the attribute information of the block that corresponds to the accessing range from the block attribute mapping information of the read equivalence management data. When the accessing range includes a block that has a "valid (V)" attribute, the block attribute analysis control unit 61a changes the accessing range (S125). Specifically, the block attribute analysis control unit 61a changes the accessing range to the range that corresponds to a block having a "valid" attribute (i.e., a range excluding a block having an "invalid" attribute or a "free" attribute) in the accessing range defined by the accessing range data request command. Alternatively, when the attribute information of the block that corresponds to the accessing range indicates an "invalid (I)" attribute or a "free (F)" attribute, the equivalence control unit 52 creates the data for which padding with zero is performed that corresponds to the accessing range as the read data. The block attribute analysis control unit 61a returns the changed accessing range or the data for which padding with zero is performed to the read control unit 54 (S126).

The read control unit 54 refers to the changed accessing range, and reads data from the BUD 64 via the read sub-control unit 57a, the BUD access control unit 62b, and the BUD driver 63b (S127, S128, and S129). Alternatively, the read control unit 54 reads the data for which padding with zero is performed.

As described above, when the data stored in the user area is read, whether or not the information stored in the block to which a read access is made is valid may be determined according to the block attribute information. Then, the block is read when valid information is stored in the destination to which a read access is made (i.e., the block is not read when valid information is not stored in the destination to which a read access is made). Accordingly, it becomes possible to read valid information from the user area (where invalid information is not read), and the efficiency of a reading process may be improved.

<Cases in Which a Writing Process is Performed by Function Control Units>

Figure 16A:
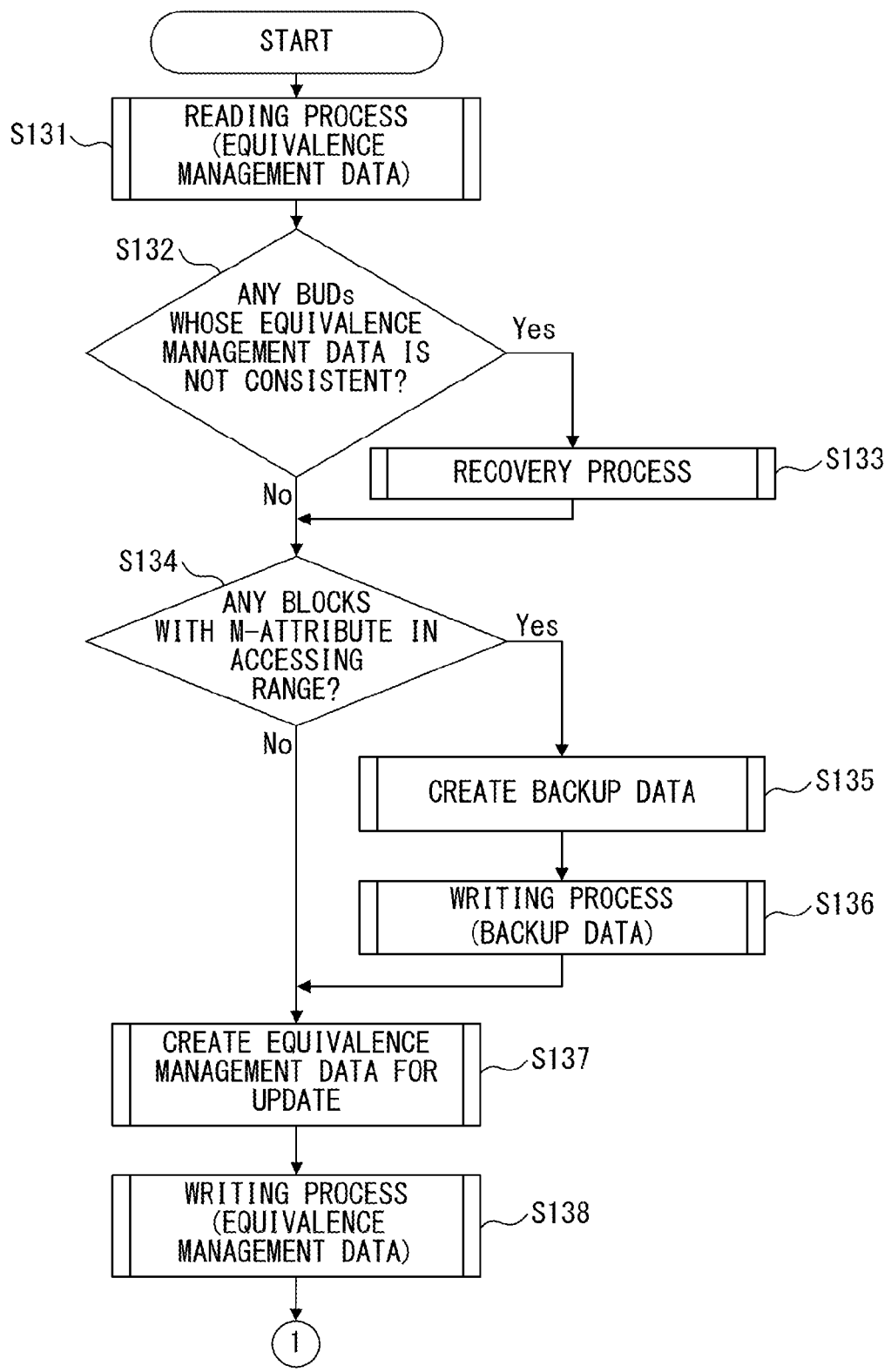
FIG. 16A illustrates the operational flow of an equivalence control unit (1) when a writing process to a BUD is performed by function control units, according to the present embodiment.
Figure 16B:
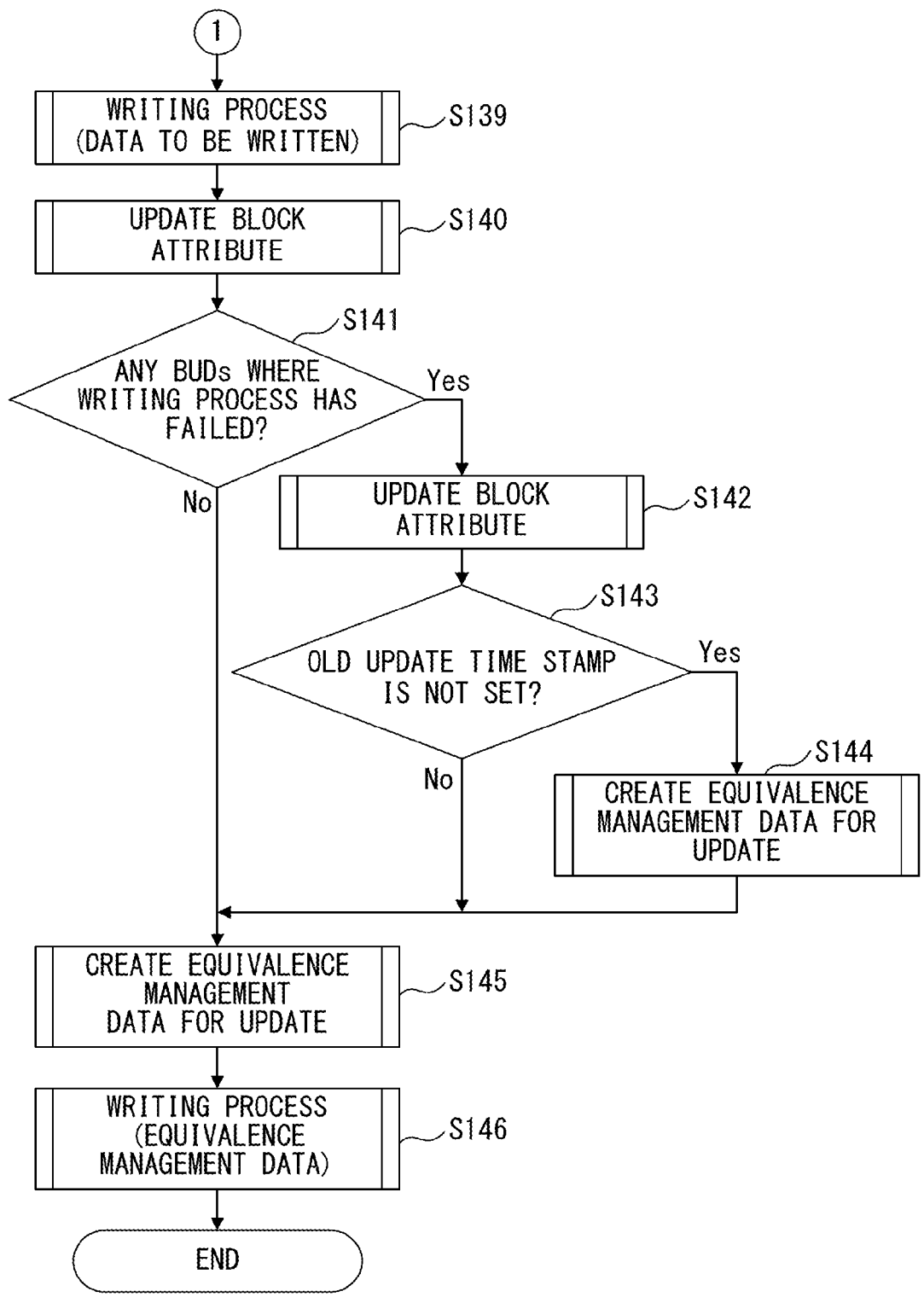
FIG. 16B illustrates the operational flow of an equivalence control unit (2) when a writing process to a BUD is performed by function control units, according to the present embodiment.

FIG. 16A and FIG. 16B illustrate the operational flows of an equivalence control unit when a writing process to a BUD is performed by function control units, according to the present embodiment. When a write request command is received from the function control unit 51, the equivalence control unit 52 reads the equivalence management data that corresponds to the user area used by the function control unit 51 from the equivalence management area of the BUDs 64 (S131).

The equivalence control unit 52 compares the equivalence management data read from the BUDs 64 with itself, and determines whether there is a BUD whose equivalence management data is not consistent (S132). In other words, the equivalence control unit 52 compares the update time stamps with the update counters of the equivalence management data read from the BUDs 64, and determines whether the update time stamps and the update counters are equal to each other.

When the update time stamps or the update counters of the equivalence management data read from the BUDs 64 are not equal to each other, the equivalence control unit 52 performs a recovery process (S133).

When the update time stamps and update counters of the equivalence management data read from the BUDs 64 are equal to each other or after the process of S133, the equivalence control unit 52 performs the following process. Specifically, the equivalence control unit 52 refers to the equivalence management data, and determines whether or not the block attribute of the range of the access destination to which the write request command from the function control unit was sent (writing destination) is a "meta (M)" attribute (S134).

In S134, when the block attribute of the range of the access destination is a "meta (M)" attribute ("YES" in S134), i.e., when data to be written is metadata, the equivalence control unit 52 regards the data to be written as backup data (S135). The equivalence control unit 52 writes the backup data in the backup area 67 of the BUD 64 (S136).

In S134, when the block attribute of the range of the access destination is "data (D)" attribute ("No" in S134), it is determined that the data to be written is not metadata (in this case, the data to be written is live data), and the process proceeds to S137.

The equivalence control unit 52 updates the valid/invalid flag of the read equivalence management data to "invalid", and updates the writing determination flag to "ON" (S137). The equivalence control unit 52 writes the updated equivalence management data in the BUD 64 (S138). The equivalence control unit 52 writes the data to be written specified in the write request command sent from the function control unit into the user area of the BUD 64 (S139). The equivalence control unit 52 updates the block attribute that corresponds to the area for which a writing process has been performed to a "valid (V)" attribute in the user area (S140).

The equivalence control unit 52 determines whether a failure in a writing process is present in any one of the BUDs to be made equivalent (S141). When a failure in a writing process is present in one of the BUDs to be made equivalent, i.e., when there is a BUD to be recovered ("YES" in S141), the equivalence control unit 52 updates the equivalence management data.

In other words, the equivalence control unit 52 sets the identification information of the BUD to which accessing has failed to the recovery attribute information included in the attribute information of the block that corresponds to the accessing range for which a write request command has been sent from a function control unit, in the equivalence management data (S142).

Here, the equivalence control unit 52 determines whether there is a BUD to be recovered according to BUD abnormalities or CM abnormalities. The equivalence control unit 52 is capable of detecting an error that indicates BUD abnormalities or CM abnormalities. If an error that indicates BUD abnormalities is detected, the BUD is replaced. Thus, the equivalence control unit 52 does not perform a setting process on the recovery attribute information. On the other hand, if an error that indicates CM abnormalities is detected, there is a possibility that the integration of the CM will be performed by using the same BUD. Thus, the equivalence control unit 52 performs a setting process on the recovery attribute information.

When the prior update time stamp is not set to the old update time stamp of the equivalence management data ("YES" in S143), the equivalence control unit 52 performs the following process. Specifically, the equivalence control unit 52 updates the "old update time stamp" 86 of the read equivalence management data with the "update time stamp" 84 (S144).

When a writing process has been successful in one of the BUDs to be made equivalent ("No" in S141) or when the process of S144 has been completed, the equivalence control unit 52 performs the following processes. The equivalence control unit 52 updates the valid/invalid flag of the equivalence management data to "valid", updates the writing determination flag to "OFF", and updates the "update time stamp" to the current time (S145). The equivalence control unit 52 writes the updated equivalence management data into the BUD 64 (S146).

FIG. 17 is a general view of the writing process sequence according to the present embodiment. The function control unit 51a in the controlling CM 33a sends a BUD access lock request command to the equivalence control unit 52a (S151).

When the BUD access lock request command is received, the equivalence control unit 52a performs exclusive control on the access between the BUDs, and performs a BUD access lock (S152). The equivalence control unit 52a returns the completion of the access lock to the function control unit from which the request command was sent (S153).

The function control unit 51a sends a data write request command to the equivalence control unit 52a (S154). The equivalence control unit 52a performs an equalization process on the data of the user areas of the BUDs such that the equivalent state will be maintained (S155). S115 is similar to S36 of FIG. 10, and FIG. 12A and FIG. 12B, and thus the description of S115 will be omitted.

Subsequently, the equivalence control unit 52a performs a writing process on the user area based on the data write request command (S156). The equivalence control unit 52a responds to the function control unit 51a from which the write request command was sent according to the write request command (S157).

When the response is received, the function control unit 51a sends a BUD access unlock request command to the equivalence control unit 52a (S158). The equivalence control unit 52a performs exclusive control on the access to the BUD, and releases the access lock to the BUD (S159). The equivalence control unit 52a responds to the unlock request command (S160).

Figure 18A:
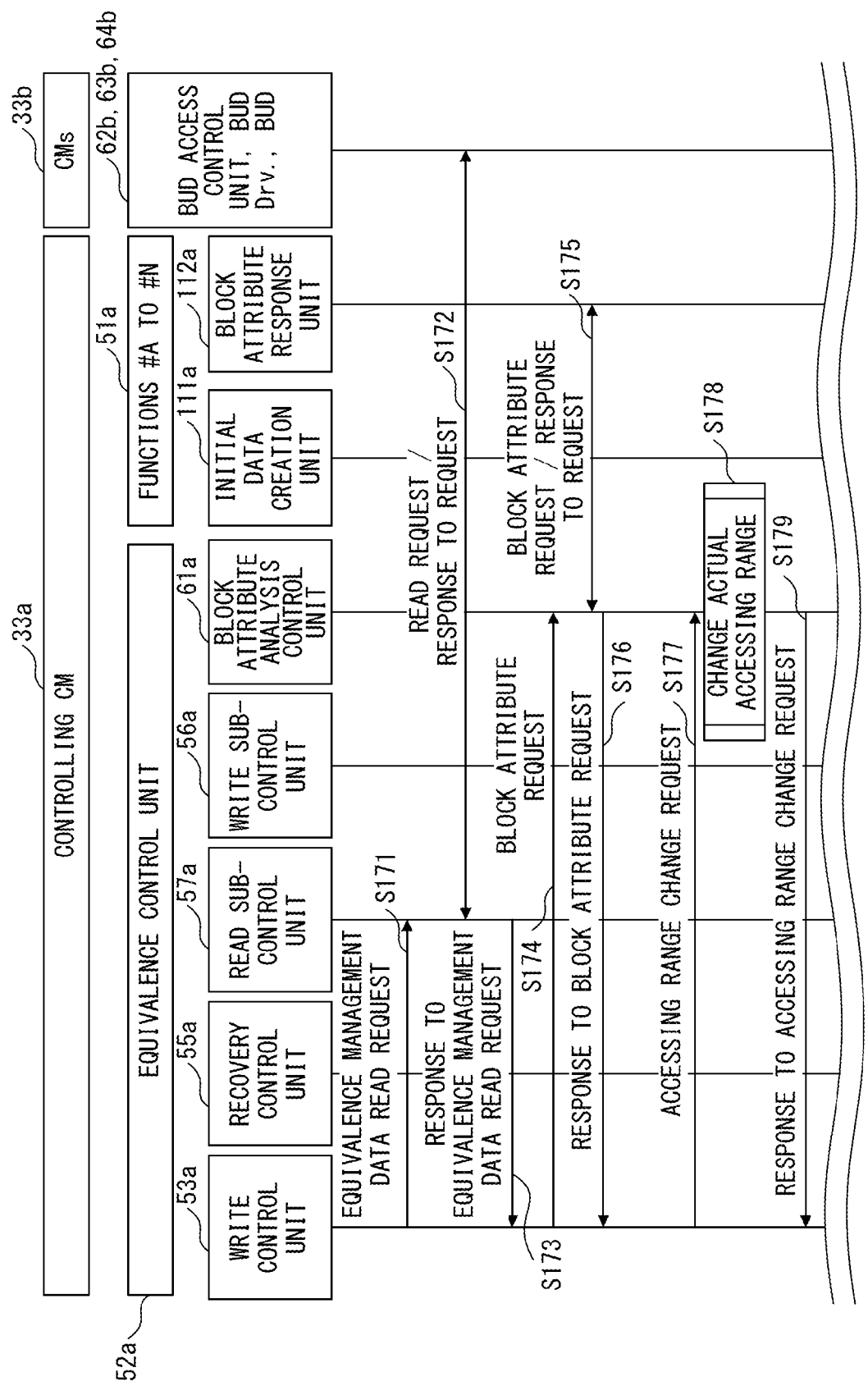
FIG. 18A is a detailed sequence diagram (1) of the writing process (S156) according to the present embodiment.
Figure 18B:
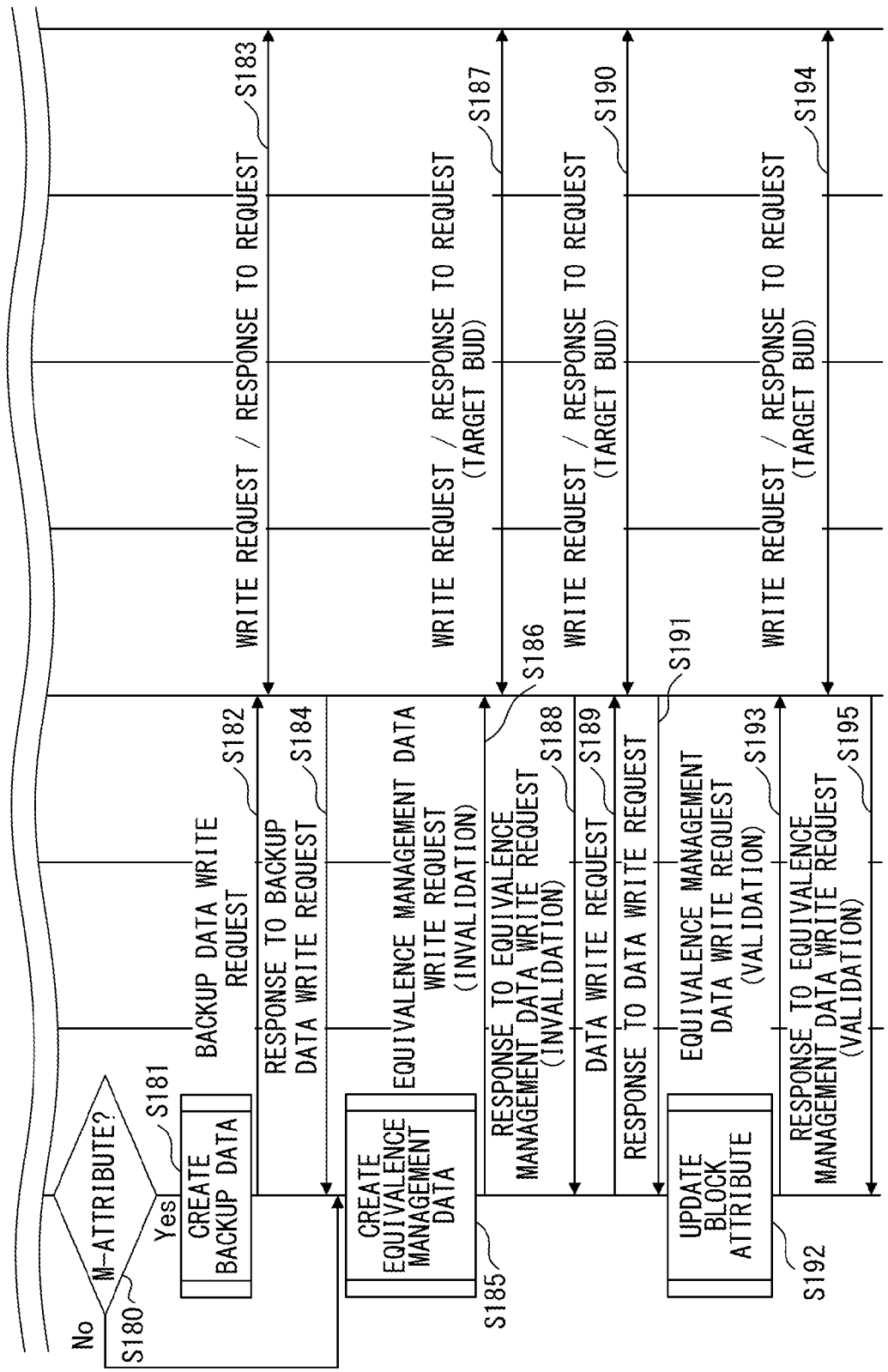
FIG. 18B is a detailed sequence diagram (2) of the writing process (S156) according to the present embodiment.

FIGS. 18A and 18B are detailed sequence diagrams of a writing process (S156) according to the present embodiment. In S156, the equivalence control unit 52a of the controlling CM 33a performs the following process based on the write request command from a function control unit.

A write control unit 53a reads the equivalence management data that corresponds to the user area used by the function control unit 51a from which the write request command was sent from the BUD 64 via the read sub-control unit 57a, the BUD access control unit 62b, and the BUD driver 63b (S171, S172, and S173).

The write control unit 53a obtains the attribute information of the area (block) of the access destination from a block attribute response unit 112a of the function control unit 51a through the block attribute analysis control unit 61a (S174, S175, and S176).

The write control unit 53a requests that the block attribute analysis control unit 61a change the accessing range (S177). When an accessing range data request command is received, the block attribute analysis control unit 61a changes the actual accessing range (S178). In other words, the block attribute analysis control unit 61a determines whether or not the block attribute that corresponds to the accessing range has a "free" attribute. When the block attribute that corresponds to the accessing range has a "free" attribute, the block attribute analysis control unit 61a returns a response to the write control unit 53a indicating that a "free (F)" will be set to the relevant block attribute information in the equivalence management data. When the block attribute that corresponds to the accessing range has an attribute other than the "free" attribute, the block attribute analysis control unit 61a returns a response to that effect (S179).

When the response from the block attribute analysis control unit 61a is a "free" attribute as a result, the write control unit 53a sets "free (F)" through the write sub-control unit 56a to the relevant block attribute information in the equivalence management data. Accordingly, when a free area is included in the accessing range, adjustment may be made to the accessing range from which the free area has been excluded.

The write control unit 53a checks whether or not the block attribute information of the range of the access destination (writing destination) belongs to a "meta (M)" attribute (S180). When the block attribute information belongs to the "meta (M)" attribute, it is considered that the information to be written is metadata. Thus, the write control unit 53a regards the information to be written (metadata) as backup data (S181). In this case, the write control unit 53a writes the backup data into the backup area 67 of the BUD 64 through the write sub-control unit 56a (S182, S183, and S184).

When the block attribute information does not belong to the "meta (M)" attribute, it is considered that the information to be written is live data. Thus, the process proceeds to S185.

The write control unit 53*a* updates the valid/invalid flag of the obtained equivalence management data to "invalid", and updates the writing determination flag to "ON" (S185).

The write control unit 53*a* writes the updated equivalence management data into the BUD 64 via the write sub-control unit 56*a*, the BUD access control unit 62*b*, and the BUD driver 63*b* (S186, S187, and S188).

The write control unit 53*a* writes the information to be written into the user area of the BUD 64 via the write sub-control unit 56*a*, the BUD access control unit 62*b*, and the BUD driver 63*b* (S189, S190, and S191).

The write control unit 53*a* updates the block attribute that corresponds to the area into which a writing process has been performed in the user area to a "valid (V)" attribute in the block attribute mapping information of the updated equivalence management data (S192).

The write control unit 53*a* updates the valid/invalid flag of the equivalence management data whose block attribute mapping information has been updated to "valid", and updates the writing determination flag to "OFF". The write control unit 53*a* writes the updated equivalence management data into the BUD via the write sub-control unit 56*a*, the BUD access control unit 62*b*, and the BUD driver 63*b* (S193, S194, and S195).

As described above, backup is performed when metadata is to be written, and backup is not performed when live data is to be written. Accordingly, it becomes possible to shorten the time taken to perform a writing process.

<Recovery (CM Integration)>

Figure 19:
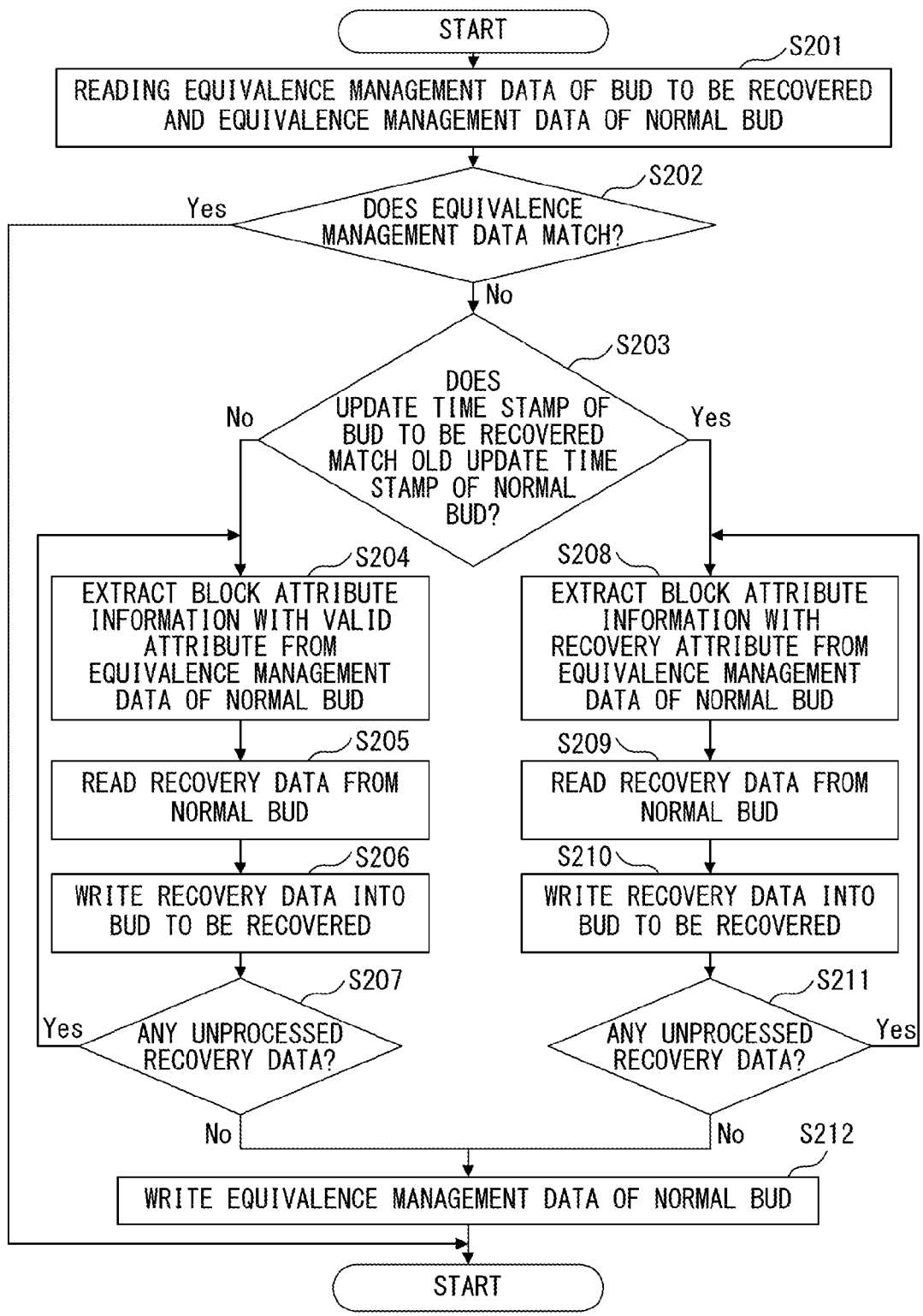
FIG. 19 illustrates an operational flow of the equivalence control unit when a recovery process is performed according to the present embodiment.

FIG. 19 illustrates an operational flow of the equivalence control unit when a recovery process is performed according to the present embodiment. When CM integration is performed, the equivalence control unit 52 reads equivalence management data from a BUD to be recovered and a normal BUD (S201).

The equivalence control unit 52 determines whether the equivalence management data read from a BUD to be recovered matches the equivalence management data read from a normal BUD (S202). When the equivalence management data matches in S202 ("YES" in S202), the present flow terminates.

When the equivalence management data does not match in S202 ("No" in S202), the equivalence control unit 52 determines whether the update time stamp of the BUD to be recovered matches the old update time stamp of the normal BUD (S203).

In S203, when the update time stamp of the BUD to be recovered matches the old update time stamp of the normal BUD ("YES" in S203), it is determined that the writing process by that time has been completed. In this case, the equivalence control unit 52 extracts block attribute information in which the identification information of the BUD is set to the recovery attribute information from the equivalence management data of a normal BUD (S208). The equivalence control unit 52 reads the user area information (recovery data) that corresponds to the block attribute information having the recovery attribute information from the user area of a normal BUD (S209). The equivalence control unit 52 writes recovery data into the area that corresponds to the user area of the BUD to be recovered (S210). The equivalence control unit 52 repeats the processes of S208 to S210 for all the blocks in which the identification information of the BUD has been set to the recovery attribute information (S211).

In S203, when the update time stamp of the BUD to be recovered does not match the old update time stamp of the normal BUD ("No" in S203), the equivalence control unit 52 extracts block attribute information having a "valid (V)" attribute from the equivalence management data of a normal BUD (S204). The equivalence control unit 52 reads the information (recovery data) of the area that corresponds to the block attribute information having a "valid (V)" attribute from the user area of a normal BUD (S205). The equivalence control unit 52 writes recovery data into the area that corresponds to the user area of the BUD to be recovered (S206). The equivalence control unit 52 repeats the processes of S204 to S207 for all the blocks with a "valid (V)" attribute (S207).

When the processes of S204 to S207 for all the blocks with a "valid (V)" attribute are repeated or when the processes of S208 to S210 for all the blocks in which the identification information of the BUD has been set to the recovery attribute information are repeated, the equivalence control unit 52 performs the following process. Specifically, the equivalence control unit 52 writes the equivalence management data of a normal BUD into the BUD to be recovered (S212). At this time, as described in S88 of FIG. 12B, after the BUD to be recovered has been recovered, the identifying information for the recovered BUD is cleared from the recovery attribute information of the equivalence management data of all the BUDs.

The detailed sequences of the recovery process between BUDs when recovery is performed according to the present embodiment are similar to those of FIGS. 12A-12C, and thus the description will be omitted.

As described above, when recovery is to be performed, it is only requested to perform recovery for a partial area (i.e., a block having attribute information that indicates the need for recovery to be performed), instead of performing recovery for the entirety of a user area. Thus, it becomes possible to shorten the time taken to perform recovery.

When data is copied from a normal BUD to a BUD to be recovered in CM maintenance or BUD maintenance, valid data excluding the recovery attribute information is copied (n.b., invalid data is not copied). For this reason, it is unnecessary to copy all the data in the user area. As a result, it becomes possible to shorten the time taken to perform recovery.

When the source data was not successfully read in the copying process, and even if the area from which data could not be read is an unused area, there is no concern about data lost caused by the abandonment of the area that is being copied.

According to the present invention, it becomes possible to achieve efficient recovery while maintaining the data consistency among storage devices.

Note that the present embodiments are not to be considered to be limited to the embodiments described above, but various configurations or embodiments may be adopted without departing from the spirit or scope of the present embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control system comprising:
a plurality of storage units each including a first storage area for storing information and a second storage area for storing management information that contains attribute information of partition information given for each of partitions obtained by partitioning the first storage area, the attribute information including valid/invalid information indicating whether or not the partition information is valid and recovery information indicating whether or not a recovery to be performed is needed;
an obtaining unit that obtains a plurality of pieces of the management information from the plurality of storage units;
a determination unit that determines first management information and second management information of the plurality of pieces of obtained management information, the first management information being normal management information obtained from a first storage unit of the plurality of storage units, the second management information being obtained from a second storage unit of the plurality of storage units that is a recovery target; and
a recovery unit that reconfigures, for each unit of the partitions, information stored in a partial area of the first storage area of the second storage unit by using information of a partial area of the first storage unit, based on the valid/invalid information or the recovery information included in the attribute information of each of the partitions in the first management information.

2. The storage control system according to claim 1, the storage control system further comprising
a writing unit that, when a write request command for target information is received, writes the target information in the first storage areas in the plurality of storage units and writes information indicating whether or not the partition information is valid into attribute information that corresponds to partition information given for a partition into which the target information has been written,
wherein the recovery unit extracts the partition information having attribute information that indicates that the partition information is valid from the first storage unit, and stores the extracted partition information in a relevant partition of the first storage area of the second storage unit.

3. The storage control system according to claim 2, wherein
when a writing process has failed in a storage unit of the plurality of storage units, the writing unit writes information that indicates a need for recovery to be performed into the attribute information of the partition information stored in the partition corresponding to an accessing range specified by the write request command, the attribute information of the partition information being included in management information of a storage unit at which a writing process has successfully been performed among the plurality of storage units, and
the recovery unit extracts the partition information having attribute information that indicates a need for the recovery to be performed from the second storage unit at which a writing process has successfully been performed, and stores the extracted partition information in a relevant partition of the first storage area of the storage unit in which a writing process has failed.

4. The storage control system according to claim 3, wherein the attribute information includes an indication of a need for the recovery to be performed and the indication identifies the storage unit in which a writing process has failed.

5. The storage control system according to claim 2, wherein the attribute information includes class information of the partition information, and
the writing unit stores information to be written in the first storage area and a backup area of the first storage area when there has been a write request command for the target information and when the class information included in attribute information of partition information given for one of the partitions that corresponds to a partition corresponding to an accessing range specified by the write request command indicates metadata, and the writing unit stores the information to be written in the first storage area when the class information does not indicate metadata.

6. A non-transitory computer-readable recording medium having stored therein a recovery program for causing a computer to execute a process comprising:
obtaining a plurality of pieces of management information from a plurality of storage units, the storage units each including a first storage area for storing information and a second storage area for storing management information that contains attribute information of partition information given for each of partitions obtained by partitioning the first storage area, the attribute information including valid/invalid information indicating whether or not the partition information is valid and recovery information indicating whether or not a recovery to be performed is needed;
determining first management information and second management information of the plurality of pieces of obtained management information, the first management information being normal management information obtained from a first storage unit of the plurality of storage units, the second management information being obtained from a second storage unit of the plurality of storage units that is a recovery target; and
reconfiguring, for each unit of the partitions, information stored in a partial area of the first storage area of the second storage unit by using information of a partial area of the first storage unit, based on the valid/invalid information or the recovery information included in the attribute information of each of the partitions in the first management information.

7. The non-transitory computer-readable recording medium according to claim 6, the process further comprising
writing, when a write request command for target information is received, the target information in the first storage area of the plurality of storage units and writing information indicating whether or not the partition information is valid into attribute information that corresponds to partition information given for a partition into which the target information has been written,
wherein when the information is to be reconfigured, the partition information having attribute information that indicates that the partition information is valid is extracted by using the first storage unit, and the extracted partition information is stored in a relevant partition of the first storage area of the second storage unit.

8. The non-transitory computer-readable recording medium according to claim 7, wherein
when a writing process has failed in a storage unit of the plurality of storage units, information that indicates a need for recovery to be performed is written into the attribute information of the partition information stored in the partition corresponding to an accessing range specified by the write request command, the attribute information of the partition information being included in management information of a storage unit at which a writing process has successfully been performed among the plurality of storage units, and when the information is to be reconfigured, the partition information having attribute information that indicates a need for the recovery to be performed is extracted from the second storage unit at which a writing process has successfully been performed, and the extracted partition information is stored in a relevant partition of the first storage area of the storage unit in which a writing process has failed.

9. The non-transitory computer-readable recording medium according to claim 8, wherein the attribute information includes an indication of a need for the recovery to be performed and the indication identifies the storage unit in which a writing process has failed.

10. The non-transitory computer-readable recording medium according to claim 6, wherein the attribute information includes class information of the partition information, and information to be written is stored in the first storage area and a backup area of the first storage area when there has been a write request command for the target information, and when the class information included in attribute information of partition information given for one of the partitions that corresponds to a partition corresponding to an accessing range specified by the write request command indicates metadata, and the information to be written is stored in the first storage area when the class information does not indicate metadata.

11. A method of performing a recovery, the method comprising:

obtaining, by using a computer, a plurality of pieces of management information from a plurality of storage units, the storage units each including a first storage area for storing information and a second storage area for storing the management information that contains attribute information of partition information given for each of partitions obtained by partitioning the first storage area, the attribute information including valid/invalid information indicating whether or not the partition information is valid and recovery information indicating whether or not a recovery to be performed is needed;

determining, by using the computer, first management information and second management information of the plurality of pieces of obtained management information, the first management information being normal management information obtained from a first storage unit of the plurality of storage units, the second management information being obtained from a second storage unit of the plurality of storage units that is a recovery target; and reconfiguring, by using the computer, for each unit of the partitions, information stored in a partial area of the first storage area of the second storage unit by using information of a partial area of the first storage unit, based on the valid/invalid information or the recovery information included in the attribute information of each of the partitions in the first management information.

12. The method according to claim 11, the method further comprising writing, by using the computer, when a write request command for target information is received, the target information in the first storage area of the plurality of storage units and writing information indicating whether or not the partition information is valid into attribute information that corresponds to partition information given for a partition into which the target information has been written, wherein when the information is to be reconfigured, the partition information having attribute information that indicates that the partition information is valid is extracted by using the first storage unit, and the extracted partition information is stored in a relevant partition of the first storage area of the second storage unit.

13. The method according to claim 12, wherein when a writing process has failed in a storage unit of the plurality of storage units, information that indicates a need for recovery to be performed is written into the attribute information of the partition information stored in the partition corresponding to an accessing range specified by the write request command, the attribute information of the partition information being included in management information of a storage unit at which a writing process has successfully been performed among the plurality of storage units, and when the information is to be reconfigured, the partition information having attribute information that indicates a need for the recovery to be performed is extracted from the second storage unit at which a writing process has successfully been performed, and the extracted partition information is stored in a relevant partition of the first storage area of the storage unit in which a writing process has failed.

14. The method according to claim 13, wherein the attribute information includes an indication of a need for the recovery to be performed and the indication identifies the storage unit in which a writing process has failed.

15. The method according to claim 11, wherein the attribute information includes class information of the partition information, and information to be written is stored in the first storage area and a backup area of the first storage area when there has been a write request command for the target information and when the class information included in attribute information of partition information given for one of the partitions that corresponds to a partition corresponding to an accessing range specified by the write request command indicates metadata, and the information to be written is stored in the first storage area when the class information does not indicate metadata.

* * * * *